US011638939B2

(12) United States Patent
Hartman et al.

(10) Patent No.: US 11,638,939 B2
(45) Date of Patent: May 2, 2023

(54) MOBILE PANEL CLEANER

(71) Applicant: Steam Tech, LLC, Denver, CO (US)

(72) Inventors: Philip J. Hartman, Windsor, CT (US); James L. Hartman, Loveland, CO (US)

(73) Assignee: Steam Tech, LLC, Denver, CO (US)

( * ) Notice: Subject to any disclaimer, the term of this patent is extended or adjusted under 35 U.S.C. 154(b) by 451 days.

(21) Appl. No.: 16/694,954

(22) Filed: Nov. 25, 2019

(65) Prior Publication Data

US 2020/0164414 A1 May 28, 2020

Related U.S. Application Data

(60) Provisional application No. 62/771,755, filed on Nov. 27, 2018.

(51) Int. Cl.
*B08B 7/04* (2006.01)
*B08B 3/10* (2006.01)
*B08B 1/00* (2006.01)
*B08B 5/02* (2006.01)
*G05B 19/048* (2006.01)
*G01S 19/13* (2010.01)
*H02S 99/00* (2014.01)

(52) U.S. Cl.
CPC .............. *B08B 7/04* (2013.01); *B08B 1/002* (2013.01); *B08B 3/10* (2013.01); *B08B 5/02* (2013.01); *G01S 19/13* (2013.01); *G05B 19/048* (2013.01); *B08B 2203/007* (2013.01); *G05B 2219/32234* (2013.01); *H02S 99/00* (2013.01)

(58) Field of Classification Search
CPC ....... B08B 2203/007; B08B 7/04; B08B 3/10; B08B 1/00; B08B 5/02; G01S 19/13; G05B 19/048
See application file for complete search history.

(56) References Cited

U.S. PATENT DOCUMENTS

| 2,576,198 A | 11/1951 | Stuart |
| 3,793,670 A | 2/1974 | Riester et al. |
| 3,881,212 A | 5/1975 | Regler |
| 5,065,471 A | 11/1991 | Laplante |
| 5,235,720 A | 8/1993 | Kinder |

(Continued)

FOREIGN PATENT DOCUMENTS

| CN | 202893749 U | * 4/2013 | ............... B08B 7/04 |
| CN | 203124355 | 8/2013 | |

(Continued)

OTHER PUBLICATIONS

Bhosale et al., IN 201502344 I3, publication date of Apr. 21, 2017; Derwent Acc No. 2017-28010G; printed from the Internet using East on Feb. 23, 2022; 2 pages.*

(Continued)

*Primary Examiner* — Ronald D Hartman, Jr.
(74) *Attorney, Agent, or Firm* — Craig R. Miles; CR Miles P.C.

(57) ABSTRACT

A mobile panel maintenance system including a mobile panel maintenance unit having a base supported for translational motion over a surface within a panel array and a carriage movably mounted to the base to position a panel maintenance assembly in relation to a panel surface for panel maintenance.

18 Claims, 23 Drawing Sheets

(56) References Cited

U.S. PATENT DOCUMENTS

| | | | |
|---|---|---|---|
| 5,539,951 A | 7/1996 | Guell et al. | |
| 5,699,581 A | 12/1997 | Heneghan et al. | |
| 5,778,483 A | 7/1998 | Dawson | |
| 5,819,360 A | 10/1998 | Fujii | |
| 5,957,384 A | 9/1999 | Lansinger | |
| 5,979,010 A | 11/1999 | Dockery et al. | |
| 6,076,216 A | 6/2000 | Biryukov | |
| 6,100,499 A | 8/2000 | Davila, Sr. | |
| 6,119,300 A | 9/2000 | Schmid et al. | |
| 6,133,546 A | 10/2000 | Bains | |
| 6,140,608 A | 10/2000 | Stingone, Jr. | |
| 6,199,300 B1 | 3/2001 | Heater et al. | |
| 6,675,434 B1 | 1/2004 | Wilhelm et al. | |
| 6,766,553 B2 | 7/2004 | Wilson | |
| 6,836,924 B2 | 1/2005 | Egner-Walter | |
| 6,892,417 B2 | 5/2005 | Franco et al. | |
| 7,592,537 B2 | 9/2009 | West | |
| 7,707,681 B1 | 5/2010 | Cabak | |
| 8,157,187 B2 | 4/2012 | Shank et al. | |
| 8,225,455 B1 | 7/2012 | Blus et al. | |
| 8,240,320 B2* | 8/2012 | Mertins | B08B 3/024 |
| | | | 134/198 |
| 8,301,020 B2 | 10/2012 | Wildegger | |
| 8,381,348 B2 | 2/2013 | Egner-Walter et al. | |
| 8,391,695 B2 | 3/2013 | Arkashevski et al. | |
| 8,550,147 B2 | 10/2013 | Lansinger | |
| 8,726,458 B1* | 5/2014 | Mahr | F24S 40/20 |
| | | | 15/340.1 |
| 8,756,739 B1 | 6/2014 | Potter et al. | |
| 8,771,432 B2 | 7/2014 | Meller et al. | |
| D727,238 S | 4/2015 | Lepper et al. | |
| 9,130,502 B1* | 9/2015 | Aly | F26B 21/004 |
| 9,192,966 B2 | 11/2015 | Zanatta | |
| 9,387,831 B2 | 7/2016 | Hartman | |
| 9,440,621 B2 | 9/2016 | Egner-Walter et al. | |
| 9,443,992 B2 | 9/2016 | Adler et al. | |
| 9,452,736 B2 | 9/2016 | Egner-Walter et al. | |
| 9,511,748 B2 | 12/2016 | Piotrowski et al. | |
| 10,023,154 B2 | 7/2018 | Piotrowski et al. | |
| 10,122,319 B2* | 11/2018 | French | A46B 13/02 |
| 10,277,163 B1* | 4/2019 | Meller | B08B 3/08 |
| 10,305,419 B1* | 5/2019 | Shugar | F24S 40/20 |
| 2002/0066473 A1 | 6/2002 | Levy et al. | |
| 2002/0137455 A1 | 9/2002 | Ivanov et al. | |
| 2003/0177599 A1 | 9/2003 | Wilson | |
| 2004/0045587 A1 | 3/2004 | Franco et al. | |
| 2007/0174989 A1 | 8/2007 | Moll et al. | |
| 2008/0216274 A1 | 9/2008 | Egner-Walter | |
| 2009/0151107 A1 | 6/2009 | Shank et al. | |
| 2009/0172907 A1 | 7/2009 | Egner-Walter et al. | |
| 2009/0283605 A1 | 11/2009 | Arkashevski et al. | |
| 2010/0037415 A1 | 2/2010 | Lansinger | |
| 2010/0043851 A1 | 2/2010 | Levy et al. | |
| 2010/0293729 A1 | 11/2010 | Lee | |
| 2011/0000525 A1 | 1/2011 | Wu et al. | |
| 2011/0047738 A1 | 3/2011 | Gross et al. | |
| 2011/0073143 A1 | 3/2011 | Levy et al. | |
| 2011/0094542 A1* | 4/2011 | Gonzalez Rodriguez | |
| | | | B08B 1/008 |
| | | | 134/109 |
| 2011/0094549 A1 | 4/2011 | Lin | |
| 2011/0126378 A1 | 6/2011 | Ota | |
| 2011/0137458 A1* | 6/2011 | Hisatani | B08B 3/024 |
| | | | 901/1 |
| 2011/0167577 A1 | 7/2011 | Egner-Walter et al. | |
| 2011/0185531 A1 | 8/2011 | Egner-Walter et al. | |
| 2012/0005855 A1 | 1/2012 | Egner-Walter et al. | |
| 2012/0120641 A1 | 5/2012 | Yassa | |
| 2012/0125367 A1 | 5/2012 | Monkman et al. | |
| 2012/0152877 A1* | 6/2012 | Tadayon | B25J 11/0085 |
| | | | 901/30 |
| 2012/0198646 A1 | 8/2012 | Kempfer et al. | |
| 2012/0285516 A1 | 11/2012 | Mckarris | |
| 2013/0097790 A1 | 4/2013 | Liao | |
| 2013/0206173 A1* | 8/2013 | Zijlstra | B08B 3/024 |
| | | | 134/6 |
| 2013/0240005 A1 | 9/2013 | Ho et al. | |
| 2013/0306106 A1 | 11/2013 | Meller et al. | |
| 2014/0007904 A1 | 1/2014 | Shapira et al. | |
| 2014/0041138 A1 | 2/2014 | Adler et al. | |
| 2014/0082879 A1 | 3/2014 | Criel et al. | |
| 2014/0202492 A1 | 7/2014 | Grossman et al. | |
| 2014/0209145 A1 | 7/2014 | Ting et al. | |
| 2014/0209146 A1 | 7/2014 | Park et al. | |
| 2014/0310906 A1 | 10/2014 | Zanatta | |
| 2014/0331434 A1 | 11/2014 | Shimoyama et al. | |
| 2015/0001201 A1 | 1/2015 | Adler et al. | |
| 2015/0258967 A1 | 9/2015 | Lepper et al. | |
| 2015/0326174 A1* | 11/2015 | Ishimura | B08B 3/02 |
| | | | 15/97.1 |
| 2015/0349706 A1 | 12/2015 | Grossman et al. | |
| 2016/0294319 A1* | 10/2016 | Ram | A46B 13/001 |
| 2016/0304065 A1 | 10/2016 | Hartman | |
| 2017/0019570 A1* | 1/2017 | Meller | H04N 5/2258 |
| 2017/0057636 A1* | 3/2017 | Azaiz | F24S 40/20 |
| 2017/0063293 A1* | 3/2017 | Parrott | B08B 1/002 |
| 2017/0093330 A1 | 3/2017 | Castellucci et al. | |
| 2017/0179873 A1* | 6/2017 | Eitelhuber | B08B 1/04 |
| 2017/0272030 A1* | 9/2017 | Chow | B05B 1/20 |
| 2018/0009006 A1* | 1/2018 | Eitelhuber | A46B 13/02 |
| 2018/0050450 A1* | 2/2018 | Parrott | B25J 9/0084 |
| 2018/0087908 A1* | 3/2018 | Bailey | G01C 21/20 |
| 2018/0118337 A1* | 5/2018 | Viel | B08B 1/002 |
| 2018/0175786 A1* | 6/2018 | Iyer | H02S 40/12 |
| 2018/0212558 A1* | 7/2018 | Meller | G05D 1/0225 |
| 2018/0212559 A1* | 7/2018 | Meller | H02S 40/38 |
| 2018/0241343 A1* | 8/2018 | Jiang | B08B 1/04 |
| 2018/0311822 A1* | 11/2018 | Kam | B25J 11/008 |
| 2018/0369874 A1* | 12/2018 | Jiang | H02S 40/10 |
| 2019/0009313 A1* | 1/2019 | Choori | H02J 3/383 |
| 2019/0044476 A1* | 2/2019 | Al-Otaibi | B08B 5/02 |
| 2019/0056744 A1* | 2/2019 | Li | B08B 1/00 |
| 2019/0093670 A1* | 3/2019 | Aggarwal | F04D 29/40 |
| 2020/0012291 A1* | 1/2020 | Peng | B25J 9/1664 |
| 2020/0169215 A1* | 5/2020 | Peng | G06T 7/13 |
| 2020/0238348 A1* | 7/2020 | Wang | B08B 13/00 |
| 2021/0265944 A1* | 8/2021 | Tanaka | H02S 40/10 |
| 2021/0389774 A1* | 12/2021 | Lu | G05D 1/0246 |
| 2021/0408963 A1* | 12/2021 | Dorsch | B08B 1/008 |
| 2022/0032446 A1* | 2/2022 | Jiang | G05D 1/0217 |
| 2022/0368280 A1* | 11/2022 | Nishimura | G05D 1/0088 |

FOREIGN PATENT DOCUMENTS

| | | | |
|---|---|---|---|
| CN | 103693019 A | 4/2014 | |
| CN | 104307784 | 1/2015 | |
| CN | 204091887 U * | 1/2015 | A47L 9/00 |
| CN | 105797993 A * | 7/2016 | B08B 1/002 |
| CN | 108832882 | 11/2018 | |
| CN | 209303272 U * | 8/2019 | B08B 1/002 |
| CN | 209551496 U * | 10/2019 | B08B 1/006 |
| DE | 3309895 | 9/1984 | |
| DE | 87 05 413 | 8/1987 | |
| DE | 3617395 | 11/1987 | |
| DE | 102004036094 | 2/2006 | |
| DE | 102008051397 | 4/2010 | |
| DE | 102010006531 | 8/2011 | |
| DE | 102012103574 A1 * | 10/2013 | A46B 13/001 |
| EP | 2048455 | 4/2009 | |
| EP | 2549199 | 1/2013 | |
| EP | 2551610 | 1/2013 | |
| EP | 2696150 | 2/2014 | |
| GB | 1 432 557 | 4/1976 | |
| JP | 53-136363 | 1/1979 | |
| JP | 05-262206 | 10/1993 | |
| JP | 2004-186632 | 7/2004 | |
| JP | 2011036833 | 2/2011 | |
| JP | 2011-181711 | 9/2011 | |
| JP | 2014-138922 | 7/2014 | |
| JP | 2014-180593 | 9/2014 | |
| JP | 2015-003310 | 1/2015 | |
| KR | 10-2006-0132893 | 12/2006 | |
| KR | 101623460 B1 * | 5/2016 | B08B 11/00 |

(56) References Cited

FOREIGN PATENT DOCUMENTS

| KR | 20170079456 A | * | 7/2017 | ............ H02S 40/10 |
|---|---|---|---|---|
| WO | WO 2005/075342 | | 8/2005 | |
| WO | 2007/000346 | | 1/2007 | |
| WO | WO 2007/015070 | | 2/2007 | |
| WO | 2008/005361 | | 1/2008 | |
| WO | WO 2009/013514 | | 1/2009 | |
| WO | 2010/034447 | | 4/2010 | |
| WO | WO-2010142837 A1 | * | 12/2010 | ............ B08B 1/04 |
| WO | 2011/004411 | | 1/2011 | |
| WO | 2011/133229 | | 10/2011 | |
| WO | 2012/123979 | | 9/2012 | |
| WO | WO-2012168070 A2 | * | 12/2012 | ............ F24J 2/461 |
| WO | 2014/001906 | | 1/2014 | |
| WO | 2014/022914 | | 2/2014 | |
| WO | 2014/080399 | | 5/2014 | |
| WO | 2014/143500 | | 9/2014 | |
| WO | 2014/163259 | | 10/2014 | |
| WO | WO 2016/197013 | | 12/2016 | |
| WO | 2017/044270 | | 3/2017 | |
| WO | WO 2018/083598 A1 | | 5/2018 | |

OTHER PUBLICATIONS

Translation of DE-102012103574-A1; Cleaning Device And Cleaning Method For Even Cleaning Surfaces; Spinner ; printed from Internet on Sep. 24, 2022; 11 pages.*
Translation of CN-209303272-U; Solar Panel Cleaning Device; Peng et al.; printed from Internet on Sep. 24, 2022; 10 pages.*
Translation of CN-105797993-A; The Solar Photovoltaic Battery Board; Zhang et al.; printed from the Internet on Sep. 24, 2022; 6 pages.*
Translation of KR 10-2017-0079456; Control System of Cleaning Robot Apparatus for Solar Panel; Hwang et al.; printed from Internet on Sep. 24, 2022; 7 pages.*
Translation of KR 101623460 B1; Solar Panel Auto Cleaning; Hwang et al.; printed from the Internet on Sep. 24, 2022; 11 pages.*
U.S. Appl. No. 14/846,906, filed Sep. 7, 2015.
International Patent Cooperation Treaty Patent Application No. PCT/US2016/047419; International Search Report and the Written Opinion of the International Search Authority, dated Nov. 4, 2016, 11 pages total.
European Patent Application No. 16844876.9; Extended European Search Report dated Mar. 28, 2019, 10 pages total.
Corresponding Japanese Patent Application No. 2018-531295; Office Action dated Jul. 13, 2020 (with English translation); 18 pages total.
Corresponding Indian Patent Application No. 201837007256; Examination Report dated Sep. 29, 2020; 7 pages.
Canadian Patent Application No. 2,807,317; Office Action dated Mar. 1, 2017, 5 pages total.
Canadian Patent Application No. 2,807,317; Office Action dated Aug. 29, 2018, 5 pages total.
Canadian Patent Application No. 2,807,317; Office Action dated Aug. 15, 2019, 6 pages total.
Chinese Patent Application No. 201680051869.6; Office Action dated Jun. 24, 2019, 9 pages total.
Korean Patent Application No. 10-2012-13257; Provisional Rejection dated May 30, 2017, 9 pages total.
European Patent Application No. 11772364.3; Office Action dated Sep. 29, 2017, 7 pages total.
European Patent Application No. 11772364.3; Office Action dated Aug. 14, 2018, 6 pages total.
European Patent Application No. 11772364.3; Office Action dated Jan. 22, 2019, 8 pages total.
European Patent Application No. 11772364.3; Office Action dated Aug. 19, 2019, 6 pages total.
Mexican Patent Application No. MX/a/2012/012194; Office Action dated Jan. 5, 2017, 3 pages total.
U.S. Appl. No. 13/642,427; Office Action dated Sep. 11, 2014.
U.S. Appl. No. 13/642,427; Office Action dated Jun. 10, 2015.
U.S. Appl. No. 13/642,427; Office Action dated Dec. 18, 2015.
U.S. Appl. No. 15/194,147; Office Action dated Jan. 11, 2019.
U.S. Appl. No. 14/846,906; Office Action dated Feb. 6, 2019.
U.S. Appl. No. 14/846,906; Office Action dated Sep. 17, 2019.
PCT International Patent Application No. PCT/US19/63754; International Search Report and Written Opinion of the International Searching Authority dated Feb. 4, 2020, 12 pages.
Egyptian Patent Application No. 2018020347; Office Action dated Jul. 15, 2020; 4 pages.
PCT International Patent Application No. PCT/US2011/000731; International Search Report and Written Opinion dated Jan. 18, 2012, 11 pages total.
PCT International Patent Application No. PCT/US20/12461; International Search Report and Written Opinion of the International Searching Authority dated Mar. 31, 2020, 11 pages.
U.S. Appl. No. 61/343,068, filed Apr. 23, 2010.
International Patent Cooperation Treaty Patent Application No. PCT/US2007/015181, filed Apr. 25, 2011.
aut0123.com. Magic Vision Control from Mercedes-Benz. Website, http://www.auto123.com, originally downloaded May 25, 2012, 3 total pages.
Autovisuals. "Magic Vision Control" in the SL roadster. Website, http://autovisuals.com, originally downloaded May 25, 2012, 9 total pages.
Daimler. The new Mercedes-Benz SL: Lightweight, athletic, luxurious. Website, http://media.daimler.com, originally downloaded May 25, 2012, 1 page.
Just-Auto. Analysis: Mercedes' Magic Vision. Website, http://www.just-auto.com, originally downloaded May 25, 2012, 3 total pages.
Mercedes-Benz. Magic Vision Control adaptive windscreen washing system. Press Information dated Mar. 2012, 3 total pages.
U.S. Appl. No. 13/642,427, filed Oct. 19, 2012.
U.S. Appl. No. 15/194,147, filed Jun. 27, 2016.
European Patent Application No. 19889445.3, Extended European Search Report dated Aug. 3, 2022, 13 pages total.
Canadian Patent Application No. 3,091,633, Office Action dated Dec. 17, 2021, 4 pages total.
Japanese Patent Application No. 2018-531295, Office Action dated Feb. 21, 2022 (with English translation), 17 pages total.
Chilean Patent Application No. 1220-2021, Examiner's Report dated Jul. 22, 2022, 11 pages total.

* cited by examiner

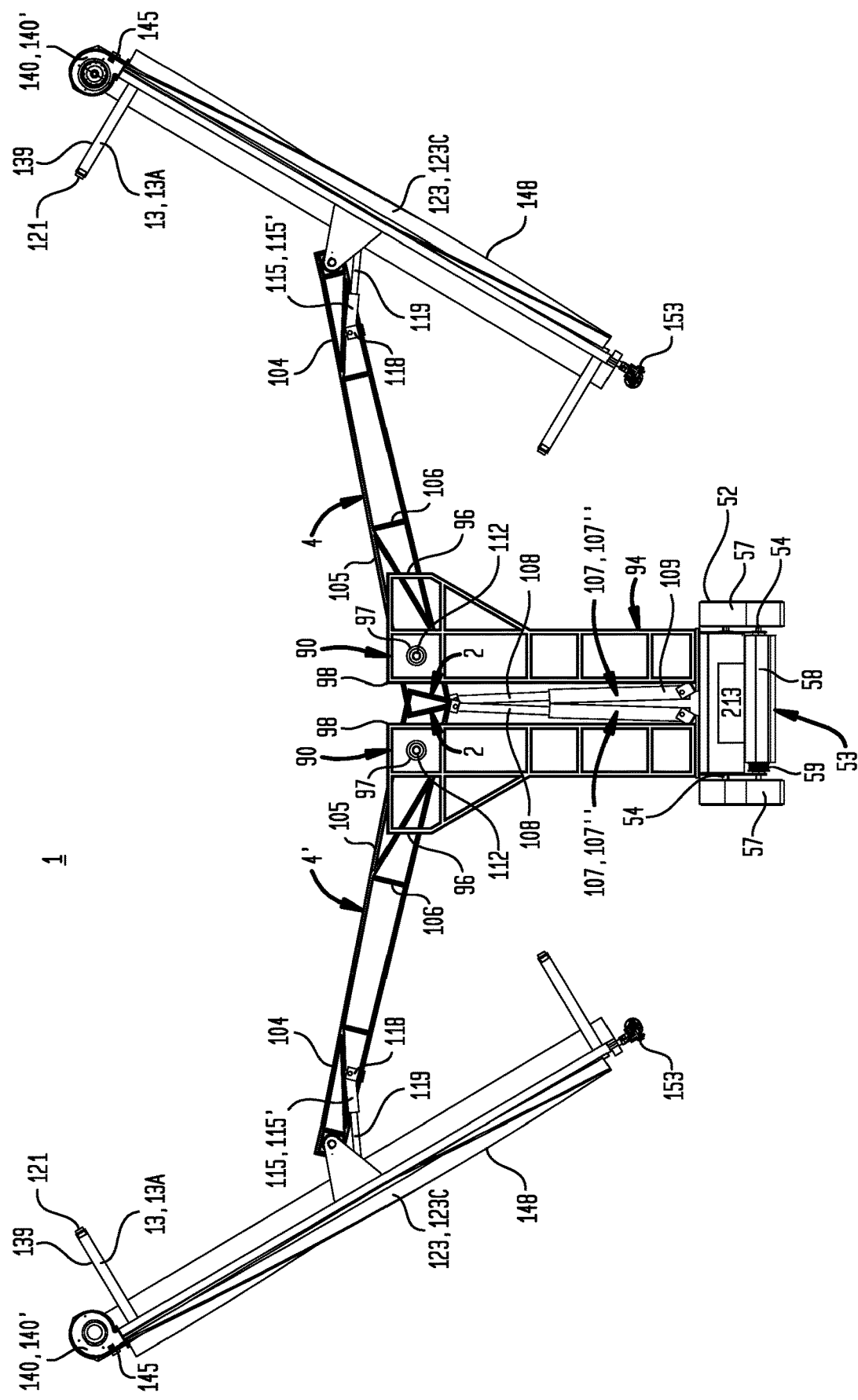

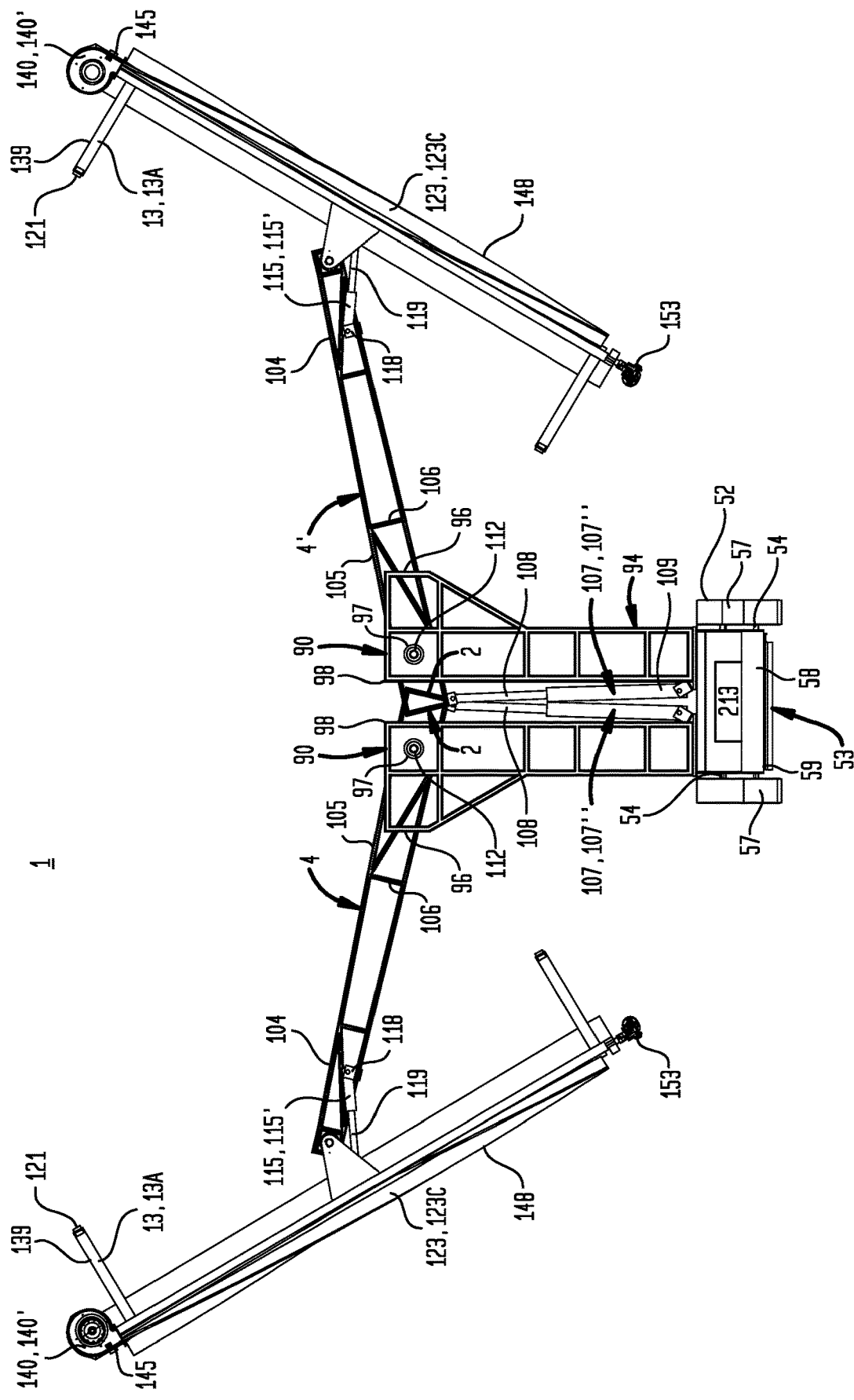

MOBILE PANEL CLEANER

This United States Non-Provisional patent application claims the benefit of U.S. Provisional Patent Application No. 62/771,755, filed Nov. 27, 2019, hereby incorporated by reference in the entirety herein.

I. FIELD OF THE INVENTION

A mobile panel maintenance system including a mobile panel maintenance unit having a base supported for translational motion over a surface and a carriage movably mounted to the base to position a panel maintenance assembly in relation to a panel for panel maintenance.

II. BRIEF DESCRIPTION OF THE DRAWINGS

FIG. 13 is first end elevation view of the illustrative embodiment of the mobile panel cleaner shown in FIG. 2 with removal of a portion of the external housing.

FIG. 14 is a second end elevation view of the illustrative embodiment of the mobile panel cleaner shown in FIG. 13.

III. DETAILED DESCRIPTION OF THE INVENTION

Figure 1:
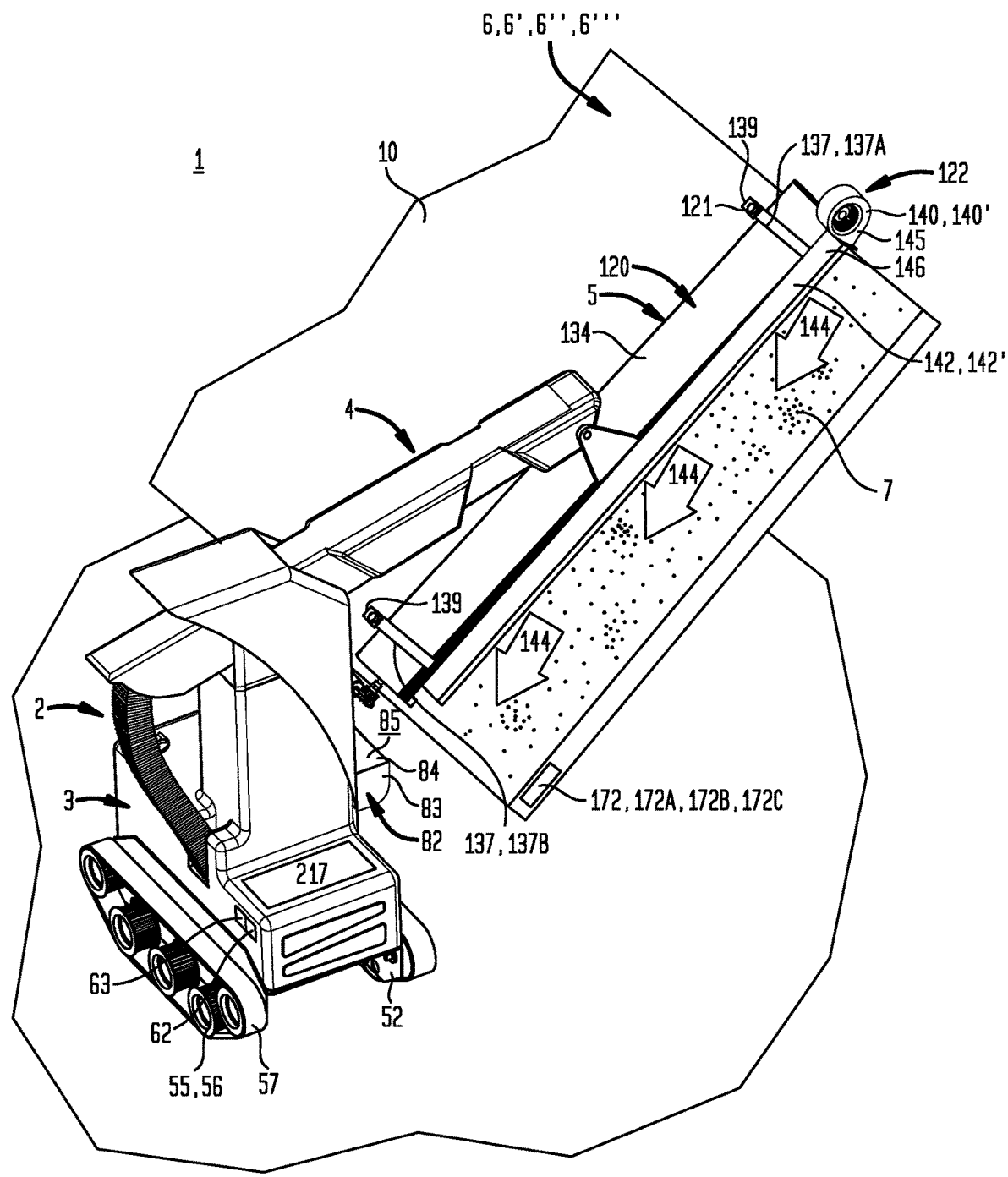
FIG. 1 is perspective view of an illustrative embodiment of a mobile panel cleaner having a one carriage arm.

Mobile Panel Maintenance System.

With general reference to FIGS. 1 through 24, embodiments of a panel maintenance system (1) (also referred to as "the system") can include a mobile panel maintenance unit (2) including a mobile base (3), a carriage arm (4) and one or more panel maintenance assemblies (5). One or more logic control circuits (8) operate to generate translational motion of the mobile base (3) over a support surface (9) to position the mobile base (3), the carriage arm (4), and the one or more panel maintenance units (5) in spatial relation to a panel external surface (10) to allow maintenance of the panel (6) including, but not necessarily limited to, removal of foreign matter (7). The one or more logic control circuits (8) can, but need not necessarily, be communicatively coupled to one or more client computing devices (11) directly, or indirectly through one or more server computers (19) over a public network (13), such as an Internet (14), a cellular-based wireless network(s) (15), or a local network (16) (individually or collectively the "network (13)"). The network (13) can support a mobile panel maintenance program (17) (also referred to as the "program") maintained in a non-transitory computer readable media (18) of the one or more server computers (19) accessible by browser based on-line processing or downloadable by one or more client computing devices (11) or one or more panel maintenance units (2). The program (17) upon execution by a server processor (20) can coordinate communication between one or more client computing devices (11) to establish on-line or off-line wired or wireless connection to implement and differentially allocate the functions of the program (17) between a plurality of client computing devices (11) and one or more mobile panel maintenance units (2).

Figure 3:
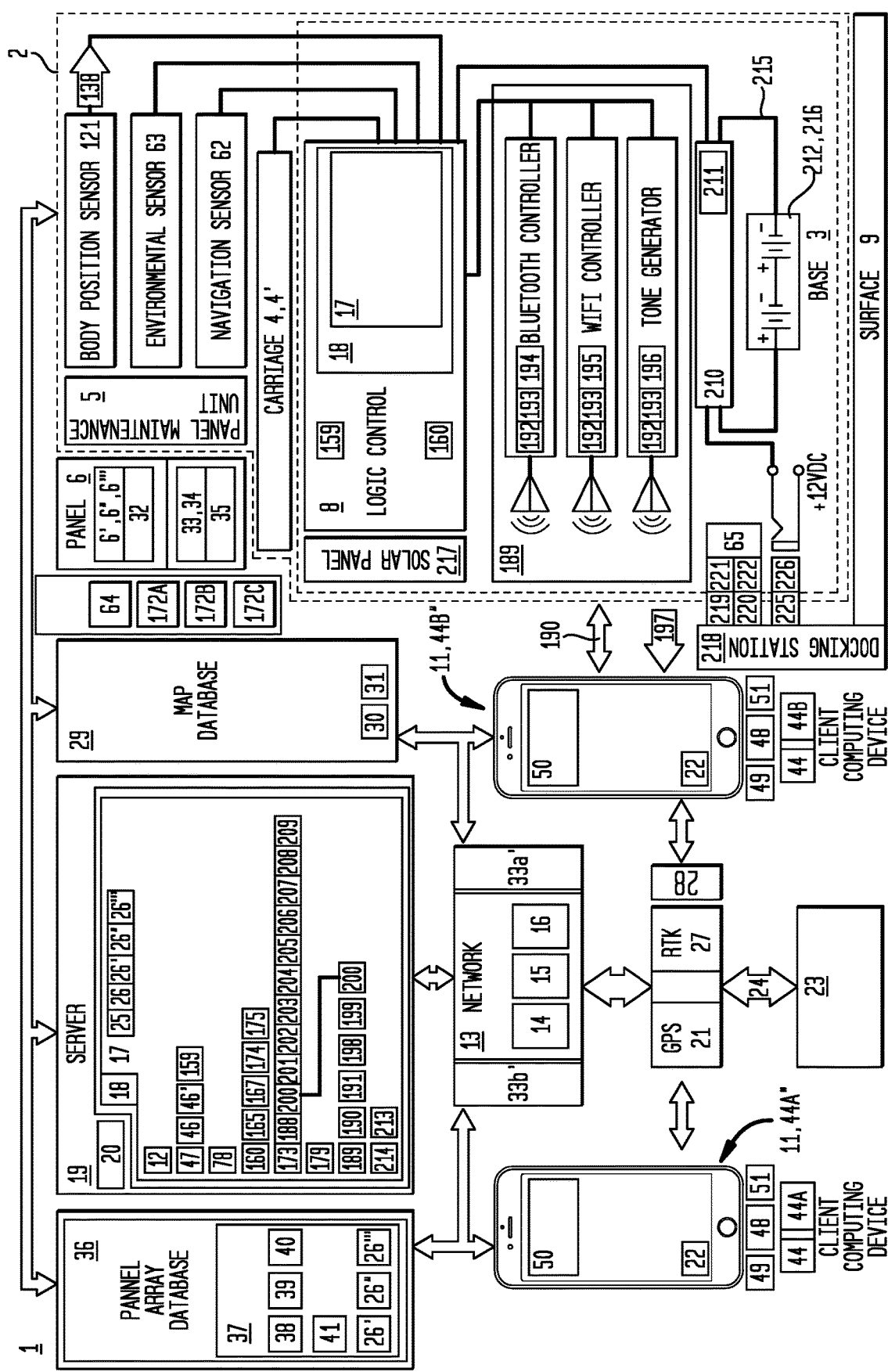
FIG. 3 is a block diagram of a particular embodiment of a mobile panel maintenance system including hardware and software components.
Figure 4:
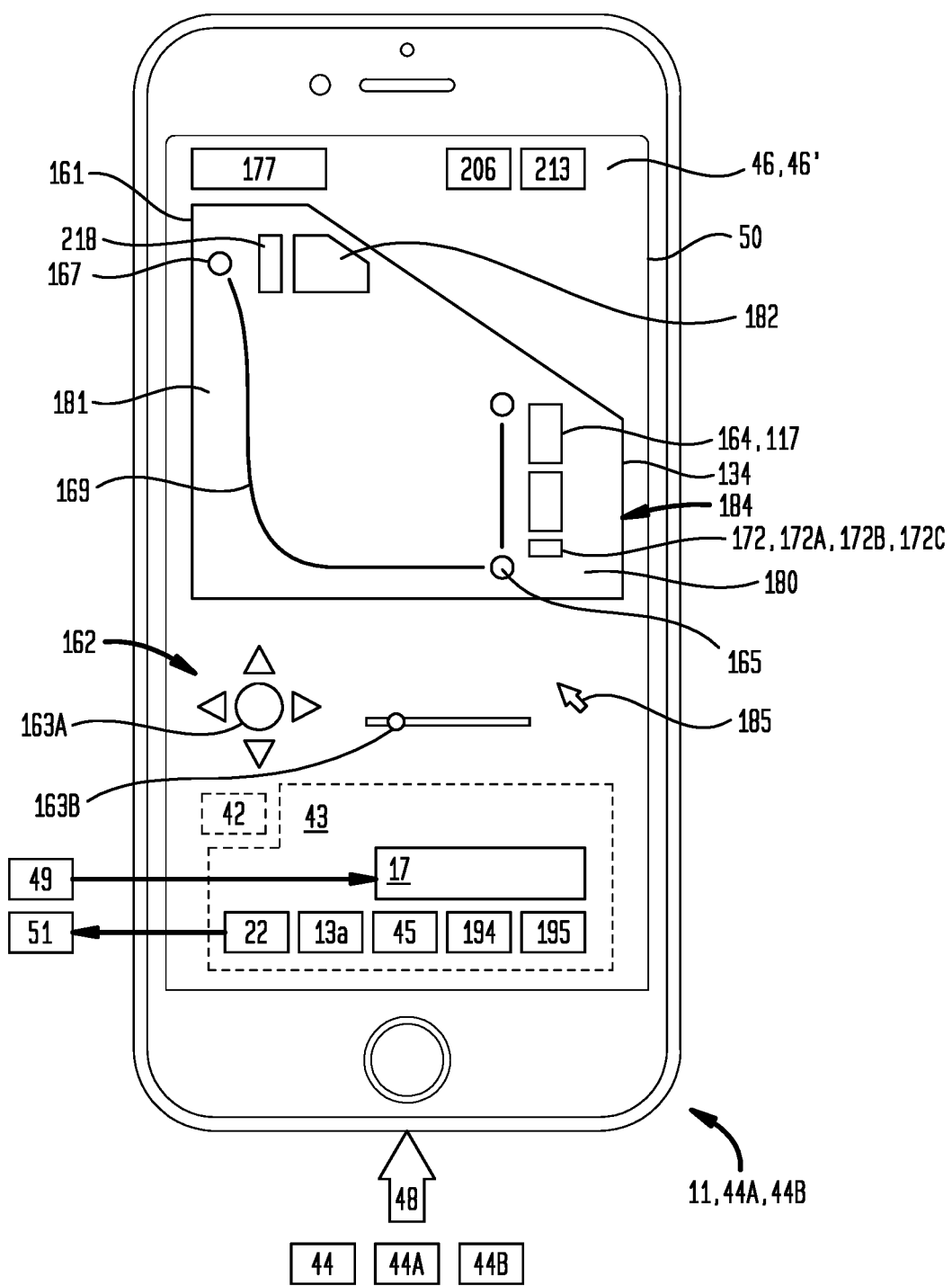
FIG. 4 is an enlargement of a particular embodiment of client computing device shown in FIG. 3.
Figure 5:
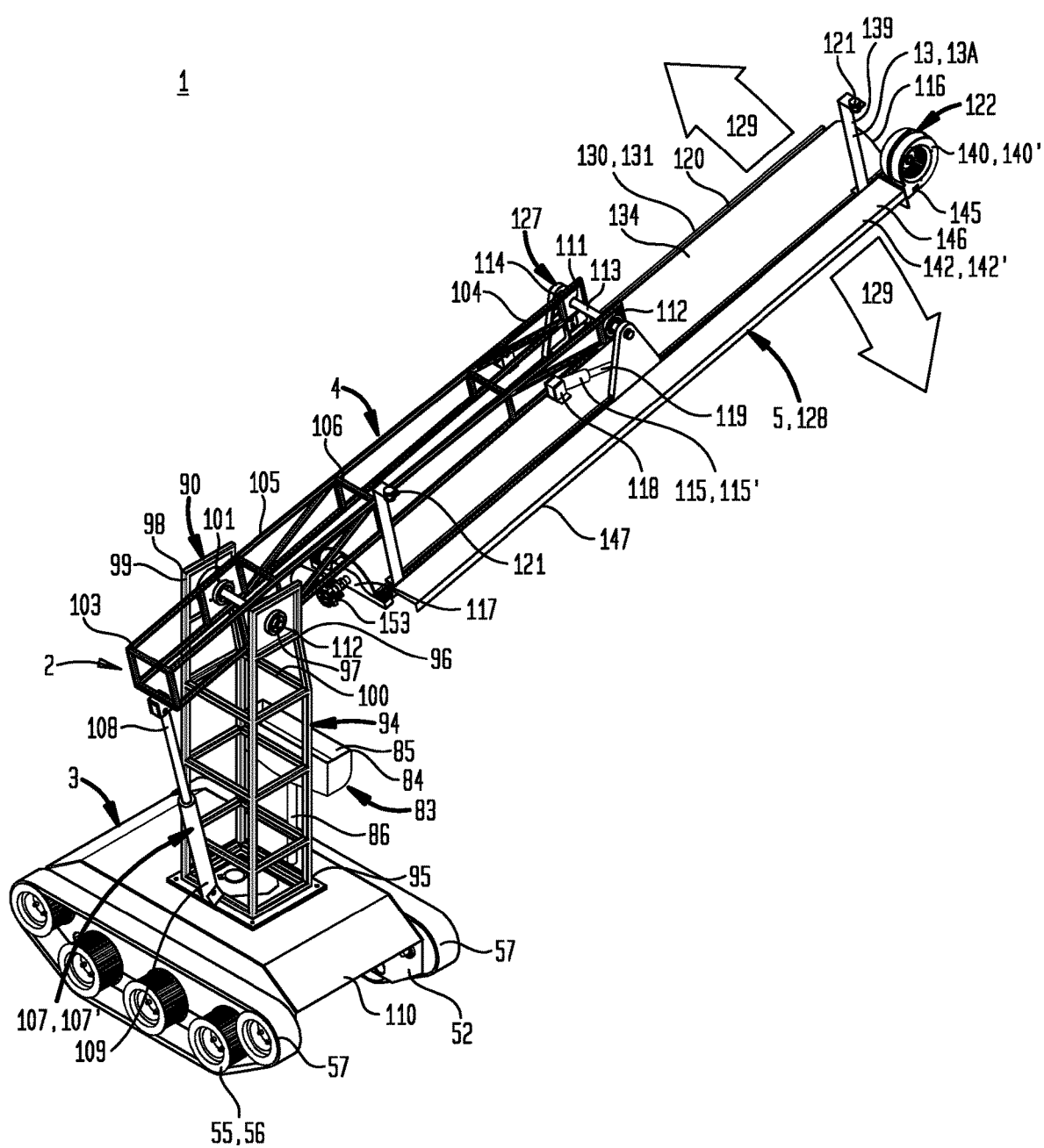
FIG. 5 is perspective view of the illustrative embodiment of the mobile panel cleaner shown in FIG. 1 with removal of a portion of the external housing.
Figure 6:
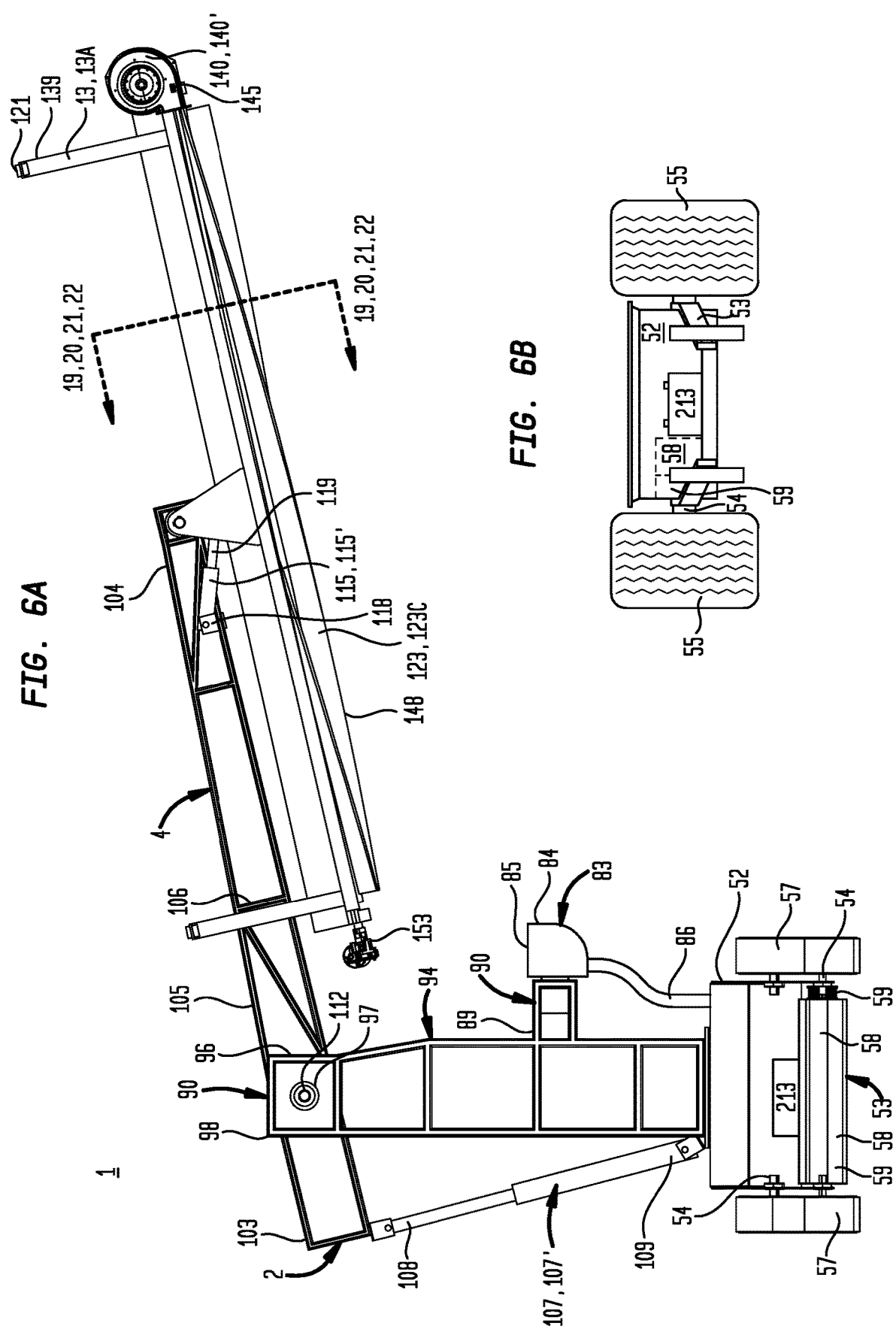
FIG. 6A is first end elevation view of the illustrative embodiment of the mobile panel cleaner shown in FIG. 5.
FIG. 6B is an optional first end elevation view of the illustrative embodiment of the mobile panel cleaner shown in FIG. 5.
Figure 7:
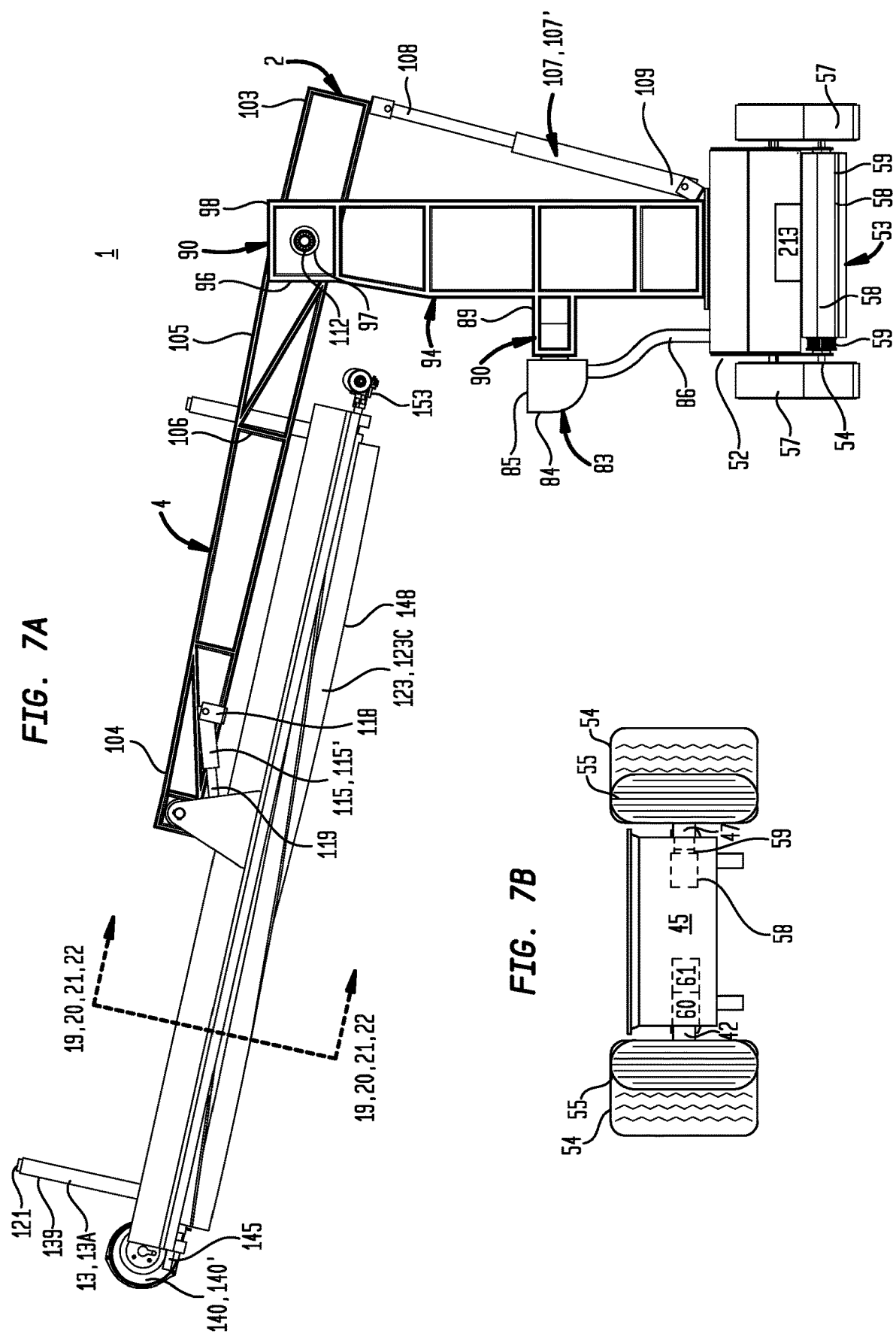
FIG. 7A is a second end elevation view of the illustrative embodiment of the mobile panel cleaner shown in FIG. 5.
FIG. 7B is an optional second end elevation view of the illustrative embodiment of the mobile panel cleaner shown in FIG. 5.
Figure 8:
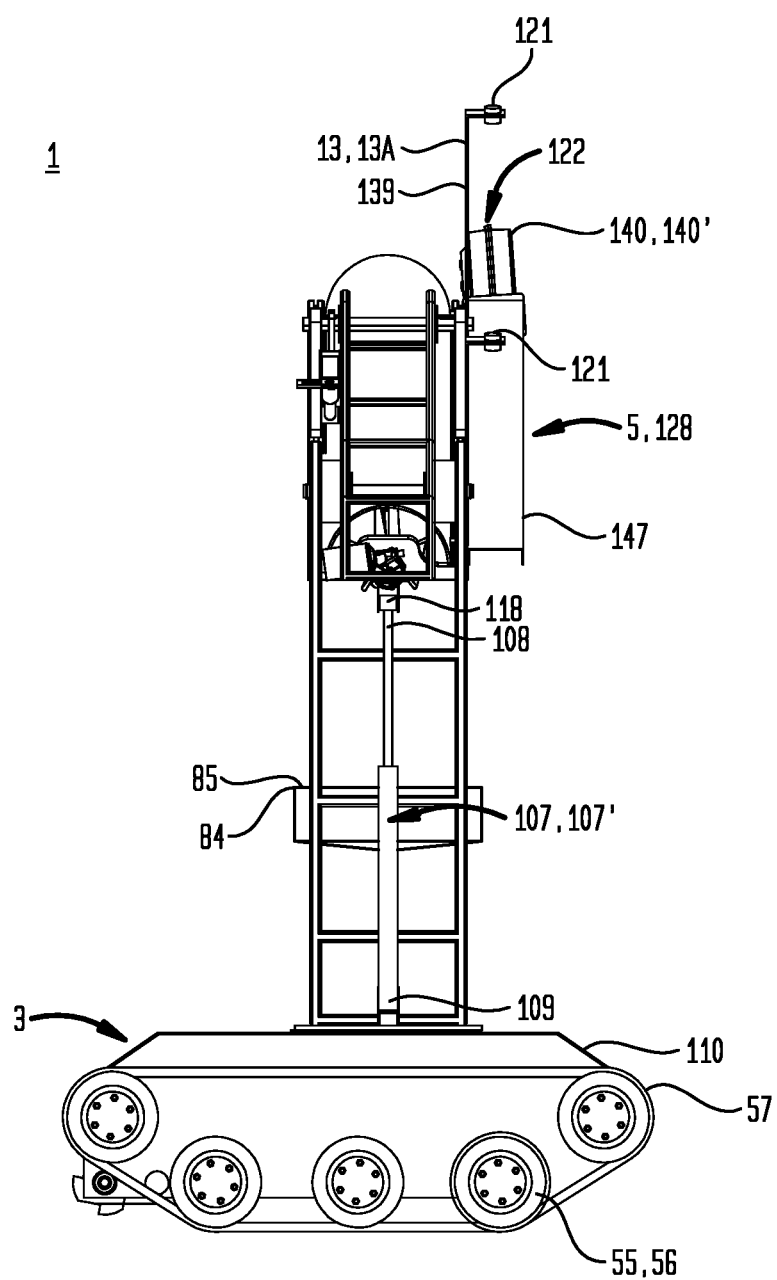
FIG. 8 is a first side elevation view of the illustrative embodiment of the mobile panel cleaner shown in FIG. 5.
Figure 9:
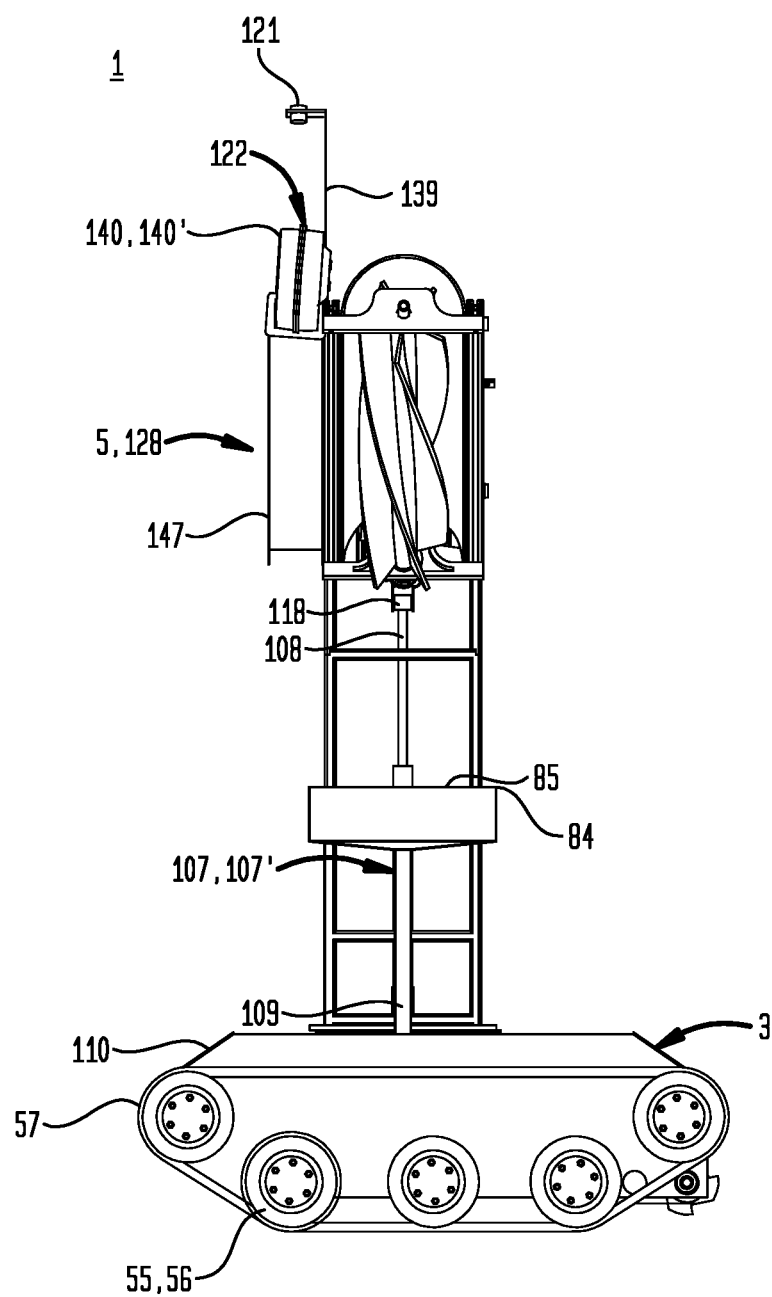
FIG. 9 is a second side elevation view of the particular illustrative embodiment of a mobile panel cleaner shown in FIG. 5.
Figure 10:
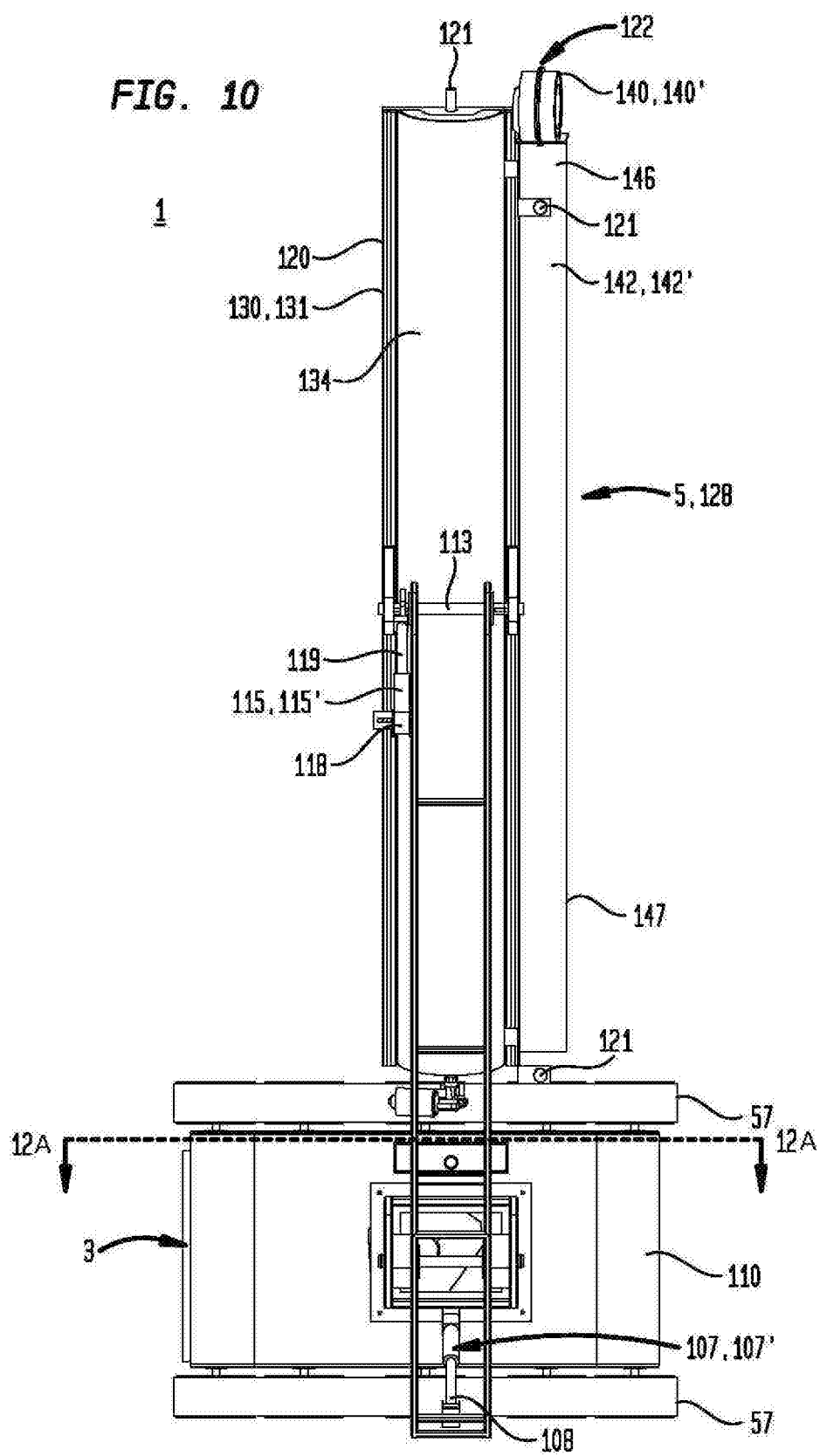
FIG. 10 is a top plan view of the illustrative embodiment of a mobile panel cleaner shown in FIG. 5.
Figure 11:
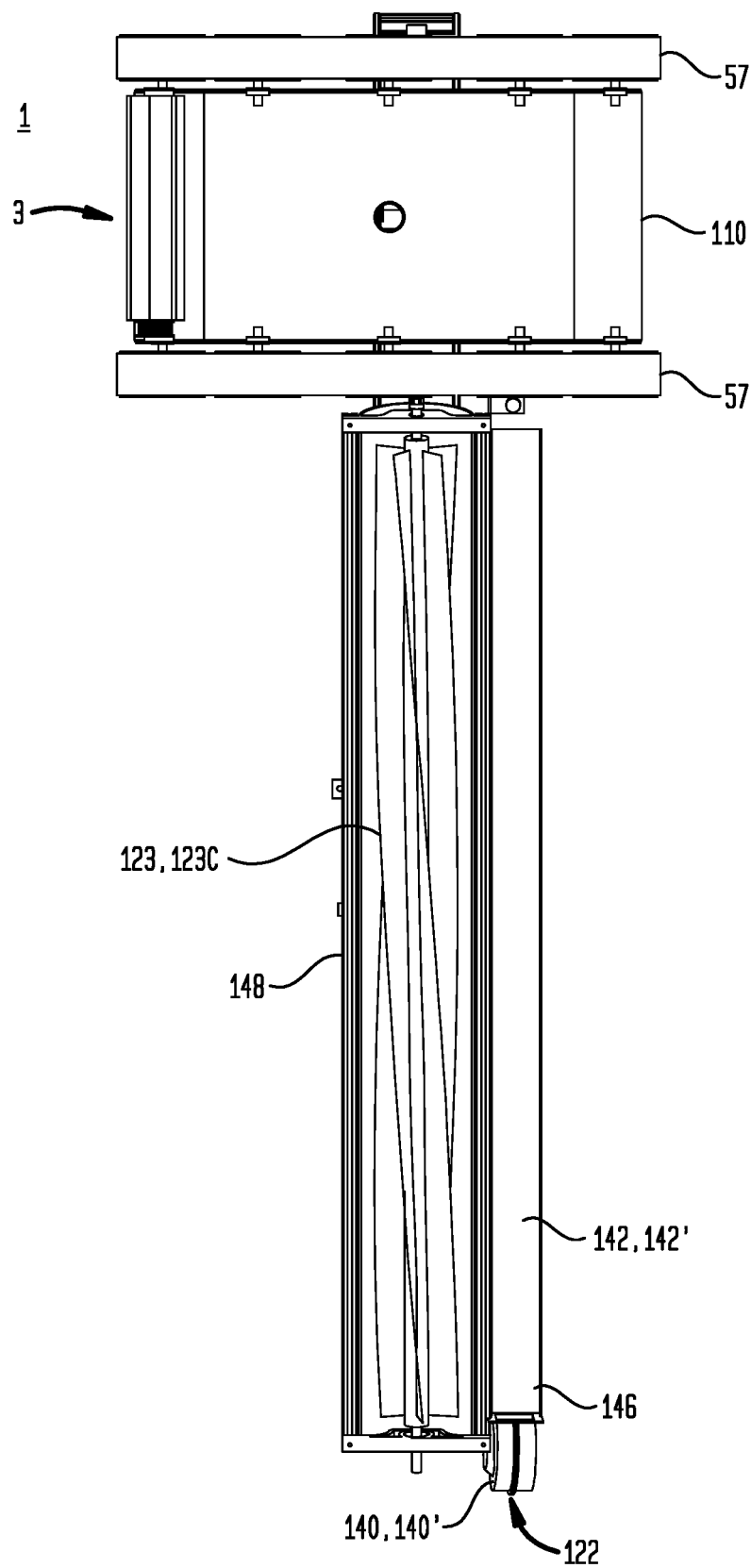
FIG. 11 is a bottom plan view the illustrative embodiment of a mobile panel cleaner shown in FIG. 5.

Now with primary reference to FIGS. 3 and 4, the system (1), the mobile panel maintenance unit (2), server processor (20), the a non-transitory computer readable media (18), the program (17) including program subroutines, modules, or partitions of the logic executable under control of the server processor (20) to carry out functions of the program (17), logic control circuits, controllers and other elements of embodiments may be shown in block diagram form. Moreover, specific implementations shown and described are exemplary only and should not be construed as the only way to implement the present disclosure unless specified otherwise herein. Additionally, block definitions and partitioning of logic between various blocks is exemplary of a specific implementation. However, the present disclosure may be practiced by numerous other partitioning solutions. For the most part, details concerning timing considerations and the like have been omitted where such details are not necessary to obtain a complete understanding of the present disclosure by persons of ordinary skill in the relevant art.

Those of ordinary skill would appreciate that the various illustrative logic blocks, modules, circuits, and algorithm described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system (1). Skilled artisans may implement the described functionality in varying ways for each particular application, but such implementation decisions should not be interpreted as causing a departure from the scope of the embodiments described herein.

When implemented with hardware, the embodiments disclosed herein may be implemented or performed with a general purpose processor, a special purpose processor, a Digital Signal Processor (DSP), an Application Specific Integrated Circuit (ASIC), a Field Programmable Gate Array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, mobile processor, or state machine. When executing software for carrying out processes for embodiments described herein, a general-purpose processor should be considered a special-purpose processor configured for carrying out such processes. A processor may also be implemented as a combination of computing devices, for example, a combination of a DSP and a microprocessor, a plurality of microprocessors, one or more microprocessors in conjunction with a DSP core, or any other such configuration.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, or a subprogram. Furthermore, the methods disclosed herein may be implemented in hardware, software, or both. If implemented in software, the functions may be stored or transmitted as the program (17) including one or more instructions or code on the non-transitory computer-readable medium (18). Computer-readable media (18) includes computer storage media and communication media including any medium that facilitates transfer of the computer program (17) from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Global Positioning System.

Now, with primary reference to FIGS. 3 and 4, in particular embodiments, the system (1) can further communicate with a global positioning system (21) ("GPS (21)"). Each of the plurality of client computing devices (11) and each of the plurality of mobile panel maintenance units (2) within the system (1) can further include a global positioning receiver (22) operably coupled to the GPS (21). The term "global positioning system (21)," for the purposes of this invention, means a plurality of earth-orbiting satellites (23) each transmitting a satellite positioning signal (24) that by operation of the global positioning receiver (22) and a GPS signal analyzer (25) of the program (17) results in determination of the location coordinates (26) of each of the plurality of mobile panel maintenance units (2) and each of the client computing devices (1), including one or more of: a longitude "x" (26'), a latitude "y" (26") or altitude "z" (26''') of the global positioning signal receiver (22) within each of the one or more mobile panel maintenance units (2) or within each of the plurality of client computing devices (11) which location coordinates (26) can be shared between the plurality of client computing devices (11) and the plurality of mobile panel maintenance units (2).

In particular embodiments, the GPS system (21) can be augmented by the use of a real time kinematics system (27) ("RTK") in which each of the plurality of client computing devices (11) and each of the plurality of mobile panel maintenance units (2) within the system (1) can further include a RTK receiver (186). A stationary base station (28) communicates with one or more mobile panel maintenance units (2). The stationary base station (28) re-broadcasts the phase of the carrier wave that it observes from GPS (21), and the mobile panel cleaners (2) by operation of the GPS signal analyzer (25) compare their own phase measurements of the carrier wave with the one received from the stationary base station (28). This allows calculation of the relative location coordinates (26) of each mobile panel maintenance unit (2) to the stationary base station (28) by the GPS signal analyzer (25). The typical nominal accuracy can be about one centimeter horizontally and about two centimeters vertically.

Map Database.

Again, with primary reference to FIGS. 3 and 4, in particular embodiments, the system (1) can further include a map database management system (29) (also referred to as the "map database (29)") which stores and serves spatial information (30). As illustrative examples, the map database (29) can comprise one or more of: GOOGLE MAPS®, MAPQUEST®, or other map databases, accessible to allow retrieval and depiction of spatial information (30) in the form of graphical two- or three-dimensional spatial information (31), which can take the form of one or more of geo-planar maps, three dimensional maps, climate maps, geopolitical maps, or the like. In particular embodiments the spatial information (30) can be depicted as a graphical geo-planar map including, at the depicted scale, certain geographic and administrative boundaries such as such as states, counties, cities, towns or residential areas and upon increasing scale can further depict roadways, manmade structures, and in the case of certain embodiments of the system (1) can further depict, the boundaries of individual panels (6) or panel arrays (6').

Panel and Panel Array.

Now, with primary reference to FIGS. 1 through 4, in particular embodiments a panel array (6') can include a plurality of panels (6). In particular embodiments, the panel (6) or the panel array (6') can be solar panel or a solar panel array in which each panel (6) (or bifacial panel) can include a light transmissive layer (32) (or opposed light transmissive layers) which receives incoming sunlight (or reflected sunlight or combinations thereof). A panel array (6') or each panel (6), can, but need not necessarily, be disposed on ground mounted support structures (33). The ground mounted support structures (33) can provide immovable fixed tilt panels (6) or can use a one axis, two axis, or three axis solar tracker (34) that operates to orient the panel array (6') or each of a plurality of panels (6) toward the Sun to minimize angle of incidence between the incoming sunlight and the light transmissive layer (32) of the panel (21). While particular illustrative examples described herein include a panel (6) having a structure which receives incoming sunlight through a light transmissive layer (32) such as a solar photovoltaic panel (6") which produces direct current which can be converted to alternating current and supplied to an electrical grid (35) or a solar thermal collector panel (6''') which absorbs heat by absorbing sunlight which can be transferred to a circulating fluid flowing within circulation conduits for space heating, production of hot water, or production of steam for generation of electricity by the use of steam turbines and supplied to an electrical grid (35), this is not intended to preclude embodiments in which the panel (6) defines an external surface of an object or component accessible by operation of a mobile panel maintenance unit (2), such as a mirror material, a panel housing, glazing material, sheathing material, or pavement material. For the purposes of this invention, term "panel array (6')" means one or a linked collection panels (6) arranged in a group at a common geographic location.

Panel Array Database.

Again, with primary reference to FIGS. 3 and 4, in particular embodiments, the system (1) can, but need not necessarily, further include a panel array database (36) including panel or panel array data (27). The panel array data (37) can include panel or panel array spatial information (38) including one or more of: panel array location coordinates (39) (longitude "x", latitude "y", altitude "z"), panel location coordinates (40) defining the dimensional boundaries of the panel array (6') or dimensional boundaries of the panel (6), or the dimensional boundaries of the light transmissive layer (32), or a current panel orientation plane (41) of a light transmissive layer (32), or combinations thereof. A panel array data module (12) of the program (17) can function to retrieve and download panel array data (37) to the logic control circuits (8) of one or more mobile panel cleaners (2).

Client Computing Device.

Again, with primary reference to FIGS. 3 and 4, embodiments of the system (1) can, but need not necessarily, include one or more client computing devices (11) each including aclient device processor (42) communicatively coupled to a client device non-transitory computer readable media (43) containing computer executable instructions including in whole or in part the program (17) to implement the functionalities of the client computing device (11) in the system (1). The processor can be central processing unit for mobile computers often referred to as a mobile processor, as examples: APPLE® A13 Bionic, Qualcomm Snapdragon 855+, Kirin 990 5G, Samsung Exynos 9825, Intel Atom, and Intel Core M. The client computing device (3) can as illustrative examples be: a desktop computer device or a mobile computer device, such as, personal computers, slate computers, tablet or pad computers, cellular telephones, personal digital assistants, smartphones, programmable consumer electronics, or combinations thereof. The program (17) can be accessed or downloaded to the client computing device (11) from the server computer(s) (19) allowing a client computing device (11) and the client computing device user (44) (also referred to as a "user (44)") to access to the functionalities of the system (1) whether on-line or off-line depending on the application.

In particular embodiments, the program (17) under control of the server processor (20) can implement the functionalities of the system (1) differently among each of the plurality of client computing devices (11). As an illustrative example, the program (17) can allocate to administrator users (44A) administrator functions (44A') of the program (17) to a first subset of the client computing devices (44A") (also referred to as "administrator computing devices (44A")") which can be communicatively coupled to the logic control circuits (8) of one or more mobile panel cleaners (2) to control and monitor movement of each of a plurality mobile panel cleaners (2), and can allocate non-administrator users (44B) non-administrator functions (44B') to a second set of client computing devices (44B") ("non-administrator computing devices (44B")") which can, as an example, limit non-administrator users (44B) to uploading panel array data (37) to the panel array database (36) or the map database (29), or make a request for movement of one or more mobile panel maintenance units (2) to an administrator computing devices (44A) and monitor movement of a subset of the plurality mobile panel maintenance units (2), but prohibit communicative coupling with the logic control circuits (8) of the plurality of mobile panel maintenance units (2).

User Interface.

In particular embodiments, each of the one or more client computing devices (11) can include a browser (45) such as Microsoft's INTERNET EXPLORER®, GOOGLE CHROME®, or the like, which functions to download and render multimedia content that is formatted in "hypertext markup language" (HTML). In this environment, the server computer (19) can be programmed to implement the most significant portions of a user interface (46). As to these embodiments, the program (17) including a user interface module (47) which implements the user interface (46) can be resident in the server (19) and the one or more client computing devices (11) within the system (1) can use the browser (45) to simply receive downloaded content and to relay user commands (48) back to the server computer (19). The server computer (19) can respond by formatting additional content and downloading the additional content to the requesting client computing device (11).

In other embodiments, the server computer (19) can be used primarily as a source of images and data, with primary responsibility for implementing the user interface (46) being placed upon each of the plurality of client computing devices (11). As to these embodiments, each of the one or more client devices (11) can run the program (17) implementing the user interface (46) to retrieve images and data from the server computer (19). While illustrative examples in this description may attribute a certain type of data to a certain server computer (19), for clarity, it is to be understood that various types of data may reside in one server computer (19) or one type of data can be distributed among a plurality of server computers (19) and embodiments of the invention can utilize server computers (19) to a lesser or greater extent depending upon the application. The program (17) further operates to provide images and data obtained from one or more server computers (19) in a common format within the system (1).

A user (44)(44A)(44B) can enter commands and information (collectively "user commands (48)") into one or more of client computing devices (11) through input devices (49) such as a keyboard, a pointing device such as a mouse; however, any method or device that converts user (44) action into commands and information can be utilized including, but not limited to: a microphone, joystick, game pad, touch screen, or combinations thereof. In particular embodiments, the user interface (46) can in part be presented as an interactive graphical user interface (46') on a display surface (50) of the client computing device (11). In addition to the display surface (50), each of the one or more client computing devices (11) can further include other peripheral output devices (51), such as: speakers and printers.

A "user command" occurs when the user (44) operates an application function through the use of a command which for example can include pressing or releasing the left mouse button while a pointer is located over a control icon (or other interactive field which activates a function) displayed in the graphic user interface (46'). However, it is not intended that a "user command" be limited to the press and release of the left button on a mouse while a pointer is located over a control icon, rather, a "user command" is intend to broadly encompass a command by the user (44) through which a function of the program (17) (or other program, application, module or the like) including the user interface module (47) which implements the graphic user interface (46') can be activated or performed, whether through selection of one or a plurality of control icon(s).

Mobile Panel Maintenance Unit.

Now, with general reference to FIGS. 1 through 23, embodiments of the mobile panel maintenance unit (2) can include individually or in combination a mobile base (3) (also referred to as "the base (3)") supported for translational motion over a support surface (9); a carriage arm (4) (also referred to as "the carriage (43)") movably mounted to the base (3), a panel maintenance assembly (5) which can be positioned in relation to the panel (6), panel array (6') or the surface or the light transmissive layer (32) of a panel (6) by translational motion of the base (3) over the support surface (9), by movement of the carriage (43), or orientation of the panel maintenance assembly (5), or combinations thereof.

Mobile Base.

Mobile Base Drive Assembly.

Again, with general reference to FIGS. 1 through 18 and with specific reference to FIGS. 6A and 6B and 7A and 7B, embodiments of the mobile base (3) can include a chassis (52) interconnected with a suspension system (53) configured to allow steerable translational motion over a support surface (9). The suspension system (53) can have spatially fixed, springingly connected, or pivotally mounted axles (54) disposed in spatial arrangement with the chassis (52). Wheels (55) can be rotatably mounted to the axles (54). In particular embodiments, the wheels (55) can, but need not necessarily, be configured as one or more drive sprockets (56) which engage and drive a continuous track(s)(57). The chassis (52) can further support a drive motor (58) (whether electric powered or fuel powered or a combination thereof), and a gearbox (59) configured to rotatingly drive at least one wheel (55), or drive sprocket (56) engaged to a continuous track (57), of the mobile base (3) to propel the mobile base (3) over the support surface (9). In particular embodiments, a steering linkage (60) can interconnect a steering actuator (61) with at least one wheel (55) rotatably mounted to a pivotally mounted axle (54). The steering actuator (61) applies push or pull forces to the steering linkage (60) to pivot at least one wheel (55) about the pivotal mount to steer the mobile base (3) over the support surface (9). In other embodiments, two continuous tracks (57) driven at different rates of speed can act to provide push pull forces to steer the mobile base (3) over the support surface (9). While the illustrative embodiments of the mobile base (3) depicted in the Figures include continuous tracks (57) this is not intended to preclude embodiments having wheels (55) which revolve on the axle (54), skis and driven tracks, or other means to propel the mobile base (3) over the support surface (9).

Navigation Sensors.

Now with general reference to FIGS. 1 through 24, the mobile base (3) can, but need not necessarily, include one or more navigation sensors (62)("NS") to sense the position of the mobile panel maintenance unit (2) in spatial relation to a panel (6) or each panel (6) in a panel array (6') to allow orientation of the panel maintenance assembly (5) in relation to the panel (6), the orientation plane (41) of the panel (6) or light transmissive layer (32) of each panel (6), including as illustrative examples: lidar sensor, image sensor (camera), infrared sensor (infrared camera), accelerometer, capacitive or capacitive displacement sensors, doppler effect sensor, eddy current sensors, inductive sensors, magnetic, photoelectric sensors, reflectivity sensors, laser-range finder sensors, infrared sensors, charge coupled sensors, radar sensors, sonar, ultrasonic sensors, fiber optics sensor, hall effect sensors, touch switch, or combinations thereof.

Environmental Sensors.

Again, with general reference to FIGS. 1 through 24, the mobile panel cleaner (2) can, but need not necessarily, include one or more environmental sensors ("ES")(63) to monitor environmental conditions (64) including, temperature sensors, snow sensors, rain sensors, humidity sensors, dew warning sensors, pyranometer sensors, particulate sensors, panel reflectivity sensors, panel light transmissivity sensors, or combinations thereof.

Fluid Reservoir.

Again, generally referring to FIGS. 1 through 24, embodiments of the chassis (52) can, but need not necessarily, further support a fluid reservoir (65) adapted to contain an amount of panel cleaning fluid (66) compatible with the panel (6) (or components of a panel (6) such as the panel housing or the light transmissive layer (32) or compatible with environmental conditions (64) surrounding the panel (6) (as illustrative examples temperature, humidity, wind, rain, snow, particulate, pollutants, or the like), or combinations thereof. In particular embodiments, the fluid reservoir (65) can, but need not necessarily, include one or a plurality of fluid chambers (67) each separately containing an amount of panel cleaning fluid (66) (whether the same or different fluids) which can be separately or proportionally mixed and delivered from the fluid reservoir (65). In particular embodiments, the fluid reservoir (65) can take the form of a fluid reservoir housing (68) configured to matingly receive one or more fluid containers (69) (whether refillable or disposable). The fluid container (69) can be removed and serially replaced by additional fluid containers (69) which contain the same or different panel cleaning fluids (66) or fluid mixtures.

Fluid.

As illustrative examples the panel cleaning fluid (66) can comprise or consist of: water, aqueous solutions of alcohols (monohydric alcohols, methanol, ethanol, isopropanol, dihydric alcohols, diethylene glycol, 1, 2 propylene glycol, dipropylene glycol). dihydric ethers, alkylphenoxypolyethanoxyethanol, ethylenediamine, ethylene oxide, ionic or non-ionic surfactants, polyphosphate, ammonia, detergent(s), methylene chloride, monoalkyl ether, alkali metal phosphate, sodium alkylbenzenesulfonate, or combinations thereof; however, this list is not meant to be exhaustive with respect to panel cleaning fluids (66) which can be utilized depending on the type of panel (6)(or panel components), the ambient environmental conditions (64), or the type of foreign matter (59)(debris, particulate, pollutants, moisture, frost, snow, or other types of foreign matter (7)) disposed on the panel (6) at the time of maintenance.

Fluid Heater.

Now, primary reference to FIGS. 3, 12A, 23 and 24, in particular embodiments, a fluid heater (70) can be thermally coupled with the panel cleaning fluid (66) contained in or delivered from the fluid reservoir (65) to increase the temperature of the panel cleaning fluid (66). In particular embodiments, the panel cleaning fluid (66) can be sufficiently heated to generate a heated gas (71), such as an amount of water converted to an amount of steam. The fluid heater (70) can take a numerous and wide variety of forms. As one illustrative example, the fluid heater (70) can be an immersion heater (72) disposed directly in the fluid reservoir (68), or as a further illustrative example can be a circulation heater (73) separate from the fluid reservoir (65) including one or a plurality of separate serially connected heating chambers (74) defining a fluid flow path from a heater inlet port (75) to a heater outlet port (76). Each heating chamber (74) can be provided with one or more electric immersion heating element(s) (72) and can further provide a fluid temperature sensor (77) for producing a fluid temperature signal (77') indicative of the fluid temperature (77"). The immersion heating element (72) of each heating chamber (74) can be independently controlled by a fluid temperature controller (78) (separate from or under control of the processor (20)) responsive to fluid temperature signals (77') from each of the fluid temperature sensors (77) which allows the immersion heating element (72) in the fluid reservoir (65) or in a heating chamber (74) to be energized only if the sensed fluid temperature (77") in that heating chamber (74) falls below a pre-selected fluid temperature (77"). The number of immersion heating elements (72) energized can be regulated based on one or more of: fluid flow rate, pre-selected fluid temperature, and heating capability of the immersion heating elements (72). This particular description of a fluid heater (70) is not intended preclude the use of other devices or methods of increasing the temperature of the panel cleaning fluid (66); and any manner of increasing the temperature of the fluid (66) can be utilized to satisfy a particular application.

As another illustrative example, the fluid heater (70) can take the form of a catalyst bed (79) fluidically coupled to the fluid reservoir (65). The catalyst bed (79) having an internal surface which supports a catalyst (80) in the form of a group 7, 8, 9, 10 or 11 transition metal. The panel cleaning fluid (66) delivered from the fluid reservoir (65) can be in the form of a mixture of peroxide and an organic compound in a ratio from about 0.2:1 to about 6:1. The reaction can be exothermic, so after the reaction has started it may continue with little or no additional heat input. The catalyst bed (79) can achieve temperatures of between about 150° C. and 250° C. with the products of water, hydrogen, carbon dioxide, and carbon monoxide in the form of heated gases or heated liquid vapor.

Fluid Flow Generator.

Again, referring primarily to FIGS. 3, 12A, 23 and 24, the chassis (52) can, but need not necessarily, further support a fluid flow generator (81) operable to generate a fluid flow of the panel cleaning fluid (66) contained in the fluid reservoir (65). As illustrative examples, the fluid flow generator (81) can take the form of a submersible pump located inside of the fluid reservoir (65) or a pump located outside of the fluid reservoir (65). As one illustrative example, the fluid flow generator (81) can be a 12 Volt fluid circulation pump having magnetic drive motor with sealed pump chamber available from BAT, Inc. PN ACP3 or PN ACP3-16.

Fluid Catch.

Figure 12A:
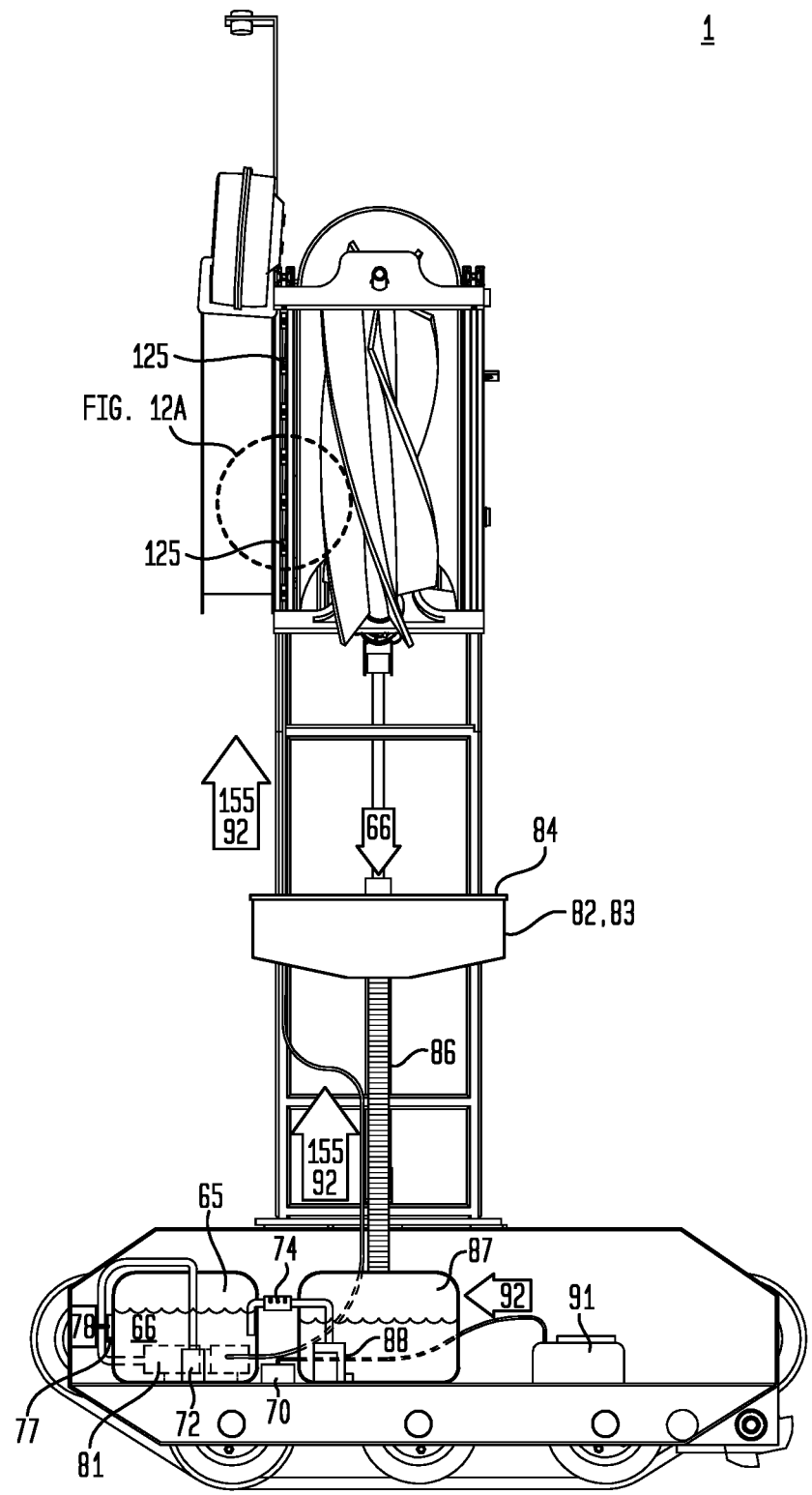
FIG. 12A is a second side elevation cross section view 12A-12A shown the illustrative embodiment of a mobile panel cleaner shown in FIG. 10.

Again, referring primarily to FIGS. 1 and 12A, embodiments of the chassis (52) can, but need not necessarily, further support a fluid catch (82). In particular embodiments of the fluid catch (82) can include one or a plurality of open-ended catch conduit(s) (83) terminating in a conduit open end (84) defining a catch open area (85). In particular embodiments, the conduit open end (84) can, but need not necessarily, be configured as long, narrow open receptacle. The fluid catch (82) can by which by location of the mobile base (3) be aligned to catch panel cleaning fluid (66)(or other fluids such as melted snow or ice, rain, or dew) from the panel (6) during panel maintenance. The fluid catch (82) can be connected by a catch conduit (86) to a fluid catch reservoir (87). Panel cleaning fluid (66)(or other fluids) caught within the fluid catch (82) can pass through the catch conduit (86) to be received by the catch reservoir (87). In particular embodiments, the panel cleaning fluid (66) received by the catch reservoir (87) can pass through a fluid filter assembly (88) to remove particulates carried in the panel cleaning fluid (66) and may be returned to the fluid reservoir (65) for re-use. With primary reference to FIG. 12A, a fluid catch support (89) can dispose the fluid catch (82) in spatially fixed immovable relation or in movable relation to the chassis (52) of the mobile base (3) by operation of a two or three-dimensional catch gimbal (90). The mobile base (3) coordinated with a movement of catch support (89)) can be located in relation to the dimensional boundaries of a panel (6) and the current orientation plane (41) of the panel (6) or light transmissive layer (32) of the panel (6), to correspondingly dispose the fluid catch (82) at a position in relation to the panel (6) to allow all or a part of the panel cleaning fluid (66) (or other fluid) flowing off from the panel (6) or the surface of the light transmissive layer (32) of a panel (6), to be received by the fluid catch (82).

Gas Flow Generator.

Figure 23:
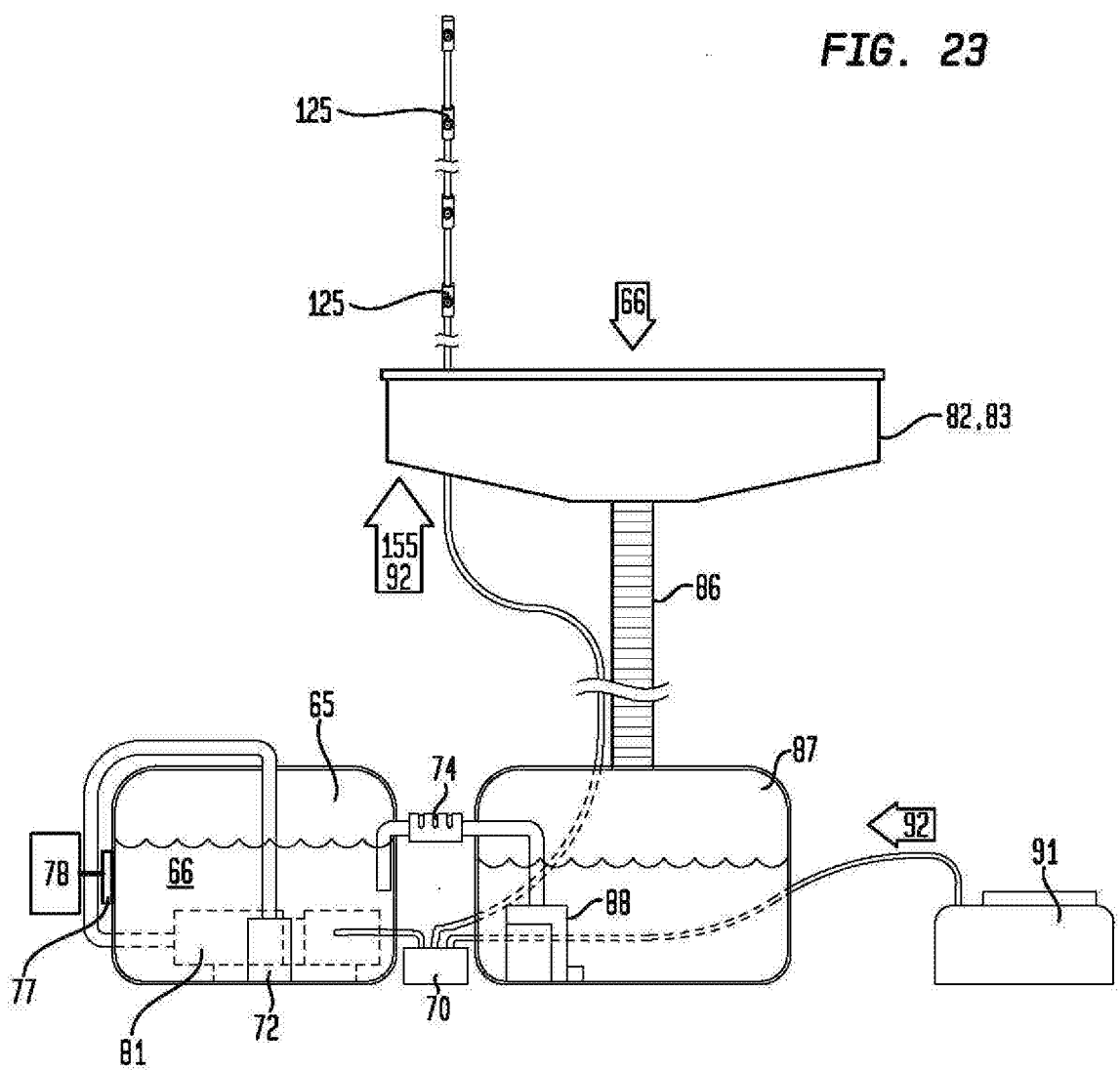
FIG. 23 is an illustration of the components included in the embodiment of the fluid catch and fluid delivery assembly shown in the illustrative embodiment of the mobile panel cleaner shown in FIG. 12A.
Figure 24:
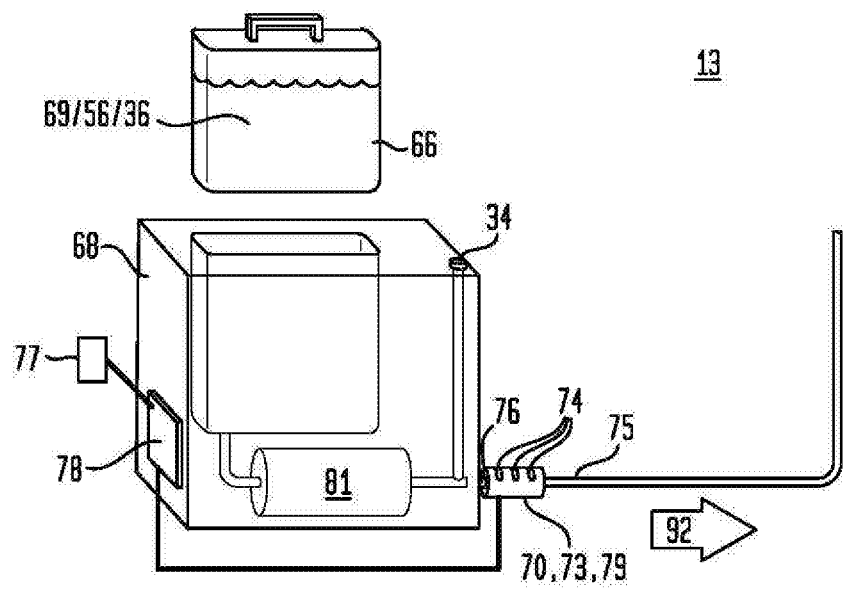
FIG. 24 is an illustration of the components included in the embodiment of the fluid reservoir and fluid heating system shown in the illustrative embodiment of the mobile panel cleaner shown in FIG. 12A.

Again, with primary reference to FIGS. 12A and 23, the chassis (52) can, but need not necessarily, further support a gas flow generator (91) operable to generate a flow of gas (92). The gas flow generator (79) can take the form of a compressor having an intermittent duty cycle or a gas pump which has a continuous duty cycle, or a vacuum pump, or a combination thereof; although these illustrative examples are not intended obviate other devices that can generate a flow of gas (92). Typically, the gas (93) will comprise a mixture of atmospheric gases; however, this example does not preclude the use of other purified gases or mixtures of gases in containers carried by the mobile base (3).

Power Source.

Again, with primary reference to FIGS. 3, 6A, 6B the chassis (45) can further support a power source (82) for operation of the components of the mobile panel maintenance unit (2). The power source (82) can take the form of an alternating current source or a direct current source, or a combination thereof, provided by one or more of interconnected network for delivering electricity to an electrical outlet, or generated by a generator, alternator, battery (213), or the like.

The Base Tower.

Now with primary reference to FIGS. 5 through 18, in particular embodiments, the chassis (52) can further support a tower (94) which extends upwardly from a tower first end (95) to terminate in a tower second end (96). In particular embodiments, the tower first end (95) can be immovably fixed in relation to the mobile base (3) and movement of the mobile base (3) can position the tower (94) in the x plane and the y plane and rotate the tower about the vertical axis (in the z plane) in relation to a panel (6). The tower second end (96) supports a carriage arm pivot (97) which defines a carriage arm rotation axis (98) about which a carriage arm (4) rotates to locate a panel maintenance assembly (5) in spatial relation to a panel (6) for panel maintenance. While the tower (94) depicted includes a plurality of upright members (99) disposed in rigid fixed relation by a plurality of cross members (100) with a pair of pivot bearing surfaces (101)(102) disposed in opposed spaced apart relation which support the carriage arm pivot (97); however, this is not intended to preclude embodiments which provide other forms of structural support for the pair of pivot bearing surfaces (101) (102). In particular embodiments which include a plurality of carriage arms (4)(4'), the tower (94) can support a plurality of pairs of pivot bearing surfaces (101)(102), each of the pairs of pivot bearing surfaces (101)(102) configured to support a corresponding carriage arm pivot (97) about which a carriage arm (4)(4') pivots.

Carriage Arm.

In particular embodiments, the carriage arm (4)(4') comprises an elongate structure having a carriage arm length disposed between a carriage arm first and second ends (103)(104). While the carriage arm (4)(4') shown in the Figures depicts a framework including a plurality of elongate load bearing framework members (105) interconnected by framework crossmembers (106), embodiments can comprise any elongate structure which can rotate about the carriage arm pivot (97) proximate the carriage arm first end (103) and bear the load of the panel maintenance unit (5) proximate the carriage arm second end (104). In particular embodiments, the carriage arm (4)(4') can be configured to pivotally couple to the carriage arm pivot (97) proximate the carriage arm first end (103). The carriage arm (4) can extend outward from the carriage arm rotation axis (98) about the carriage arm pivot (97) to terminate in the carriage arm first end (103). The extending carriage arm (4) can be coupled to a carriage arm actuator (107) operable to rotate the carriage arm (4) about the carriage arm pivot (97) to correspondingly move the carriage arm second end (104). As shown in the Figures, the carriage arm actuator (107) can, but need not necessarily, be a carriage arm linear actuator (107') having an actuator first end (108) coupled proximate the carriage arm first end (103) and having an actuator second end (109) coupled to the mobile base (3), the tower (94), the chassis (52) or base housing (110)). Upon operation, the carriage arm linear actuator (107') can increase or decrease in actuator length to correspondingly rotate the carriage arm (4) about the carriage arm pivot (97) to move the carriage second end (104) in opposing direction. In particular embodiments, the carriage arm linear actuator (107') can, but need not necessarily, be a motor coupled to a lead screw with a lead nut or ball nut which travels along the lead screw as it rotates to convert rotational motion into linear displacement to rotate the carriage arm (4) about the carriage arm pivot (97). In particular embodiments, the carriage arm linear actuator (107') can, but need not necessarily, be a hydraulic or pneumatic cylinder which inherently produce linear motion. Alternately, the carriage arm actuator (107) can comprise any mechanism which operates to rotate the carriage arm (4) about the carriage arm pivot (97) including as illustrative examples: cam actuator, winch, wheel and axle, or a sun gear which drives planet gears which correspondingly drive a ring gear about the carriage arm pivot which correspondingly rotates the carriage arm (4).

The carriage arm (4)(4') supports a pair of pivot bearing surfaces (111)(112) disposed in opposed spaced apart relation proximate the carriage arm second end (104) which support a panel maintenance assembly pivot (113) defining a panel maintenance assembly rotation axis (114) about which a panel maintenance assembly (5) can rotate to locate the panel maintenance assembly (5) in spatial relation to a panel (6) for panel maintenance. A panel maintenance assembly actuator (115) can be disposed between the carriage arm (4) proximate the carriage arm second end (104) and the panel maintenance assembly (5). The panel maintenance assembly actuator (115) can be operated to rotate the panel maintenance assembly (5) about the panel maintenance unit pivot (113) to correspondingly adjust the location of the panel maintenance assembly first end (116) and the panel maintenance assembly second end (117) in spatial relation to a panel (6) for panel maintenance. As shown in the Figures, the panel maintenance assembly actuator (115) can, but need not necessarily, be a panel maintenance assembly linear actuator (115') having an actuator first end (118) coupled proximate the carriage arm second end (104) and having an actuator second (119) coupled to the panel maintenance assembly (5). Upon operation, the panel maintenance assembly linear actuator (115') can increase or decrease in actuator length to correspondingly rotate the panel maintenance assembly (5) about the panel maintenance unit pivot (113) to move the maintenance assembly first and second ends (116)(117) in opposing direction. In particular embodiments, the panel maintenance assembly linear actuator (115') can, but need not necessarily, be a motor coupled to a lead screw with a lead nut or ball nut which travels along the lead screw as it rotates to convert rotational motion into linear displacement to rotate the panel maintenance unit (5) about the panel maintenance unit pivot (113). In particular embodiments, the panel maintenance assembly linear actuator (115') can, but need not necessarily, be a hydraulic or pneumatic cylinder which inherently produce linear motion. Alternately, the panel maintenance assembly actuator (115) can comprise any mechanism which operates to rotate the panel maintenance unit about the panel maintenance unit pivot (113) including as illustrative examples: cam actuator, winch, wheel and axle, or a sun gear which drives planet gears which correspondingly drive a ring gear about the panel maintenance unit pivot which correspondingly rotates the panel maintenance unit (5).

Panel Maintenance Assembly.

Now referring generally to FIGS. 1 through 22, embodiments of the mobile panel maintenance unit (2) can further include a panel maintenance assembly (5) rotatably connected to the carriage arm second end (104). In particular embodiments, the panel maintenance assembly (5) includes a panel maintenance assembly body (120) (also referred to as the "body") which can carry one or more of: a body position sensor (121), a blower assembly (122), outwardly extending sweeps (123), one or more outwardly extending wipers (124), one or more fluid ports (125), or combinations thereof. In particular embodiments, the carriage arm (4) can operate to interchange a diverse set of panel maintenance assemblies (5). In particular embodiments, the carriage arm (4) can include an adapter locking mechanism (126) used to attach and detach each of a plurality of panel maintenance assemblies (5) to the carriage arm (4). The purpose of the panel maintenance assembly (5) can be changed by unlocking the adapter locking mechanism (126) and locking a different panel maintenance assembly (5) on to the carriage arm (4).

Panel Maintenance Body.

Again, with general reference to FIGS. 1 through 22, the body (120) can be have wide variety of configurations to dispose the body position sensor (121), blower assembly (122), sweeps (123), wipers (124) or fluid ports (125), or combinations thereof, in relation to the panel (6) or the light transmissive layer (32) of a panel (6). The body (120) can be mounted on a one axis, two axes, or three axis panel maintenance gimbals (127). In particular embodiments, as depicted the body (120) can be mounted on a single axis to the carrier arm (4) to afford opposite reciprocal travel of a body first end (116) and a body second end (117) allowing pivotal rotational positioning of the body (120). In particular embodiments, opposite reciprocal travel of the body first end (116) and a body second end (117) can be achieved by operation of the panel maintenance assembly actuator (115) above described. In other particular embodiments, the body (120) can be springingly coupled to the carriage arm (4) to springingly resist rotation of the body (120) about the panel maintenance unit pivot (113) from an initial first radial position (128) toward a second radial position (129) and bias rotation of the body (120) toward the initial first radial position (128).

Now, with primary reference to FIGS. 5 through 22, the body (120) can include a panel maintenance body structural framework (130) including a plurality of elongate members (131) disposed in opposed relation a distance apart and correspondingly joined by first and second end pieces (132) (133). The panel maintenance body structural framework (130) can carry the body position sensor (121), the blower assembly (122), the sweeps (123), the wipers (124) or fluid ports (125), or combinations thereof. A body housing (134) can be attached to the structural framework (130) to house components of the panel maintenance body (120). The body (120) can have a body length selected based upon the application or use, such as dimensions of the panels (6) in a panel array (6') (as shown in the illustrative examples of FIGS. 1 and 2). However, this description of the body (120) is not intended to preclude other structural configurations which can carry the body position sensor (121), the blower assembly (122), the sweeps (123), the wipers (124) or fluid ports (125), or combinations thereof. As shown in the illustrative example of FIGS. 5 through 22, a particular embodiment of the body (120) can comprise a generally flat framework (130) including a pair of elongate members (135)(136) disposed a distance apart in fixed immovable spatial relationship. The framework (130) can be rotatably coupled or springingly rotatably coupled a single axis to the carrier arm (4), as above described; however, this illustrative example is not intended to prelude embodiments mounted on two or three axis gimbals.

Panel Maintenance Body Position Sensor.

Now with primary reference to FIGS. 5 through 22, in particular embodiments, one or more body position sensors (121) can sense the opposite reciprocal travel of the body first end (116) and a body second end (117) in relation to a panel (6) or the light transmissive layer (32) of a panel (6). As illustrative examples, the one or more body position sensors (121) can include an image sensor (such as a camera), an infrared sensor (in such as an infrared camera), an accelerometer, a capacitive or capacitive displacement sensor, a doppler effect sensor, an eddy current sensor, an inductive sensor, a photoelectric sensor, a reflectivity sensor, a laser-range sensor, an infrared sensor, radar sensor, a sonar sensor, ultrasonic sensor, a fiber optics sensor, a hall effect sensors, a touch switch, or combinations thereof. In particular embodiments, one or more sensors can be disposed on the body framework (130) or body housing (134) proximate one or both of the first and second ends (116)(117) of the panel maintenance assembly (5). In particular embodiments, the one or more sensors (121) can be disposed on a sensor support (137) outwardly extending from the panel maintenance unit (5) proximate the first and second ends (116) (117). The sensor support (137) or placement of the one or more sensors (121) on the sensor support (137) can dispose the one or more sensors (121) at a location in relation to the surface of the panel (6) to generate a sensor signal (138) which varies based on the distance of the one or more sensors (121) from the surface of the panel (6). The sensor signal (138) can be analyzed by the program code (17) under control of the processor (20)(42) to determine the distance between each of the first and second end (116)(117) of the body (120) and the surface of the panel (6) and then operate one or more of the mobile base (2), the carriage arm actuator (107), and the panel maintenance unit actuator (115) to position the panel maintenance unit (5) in the proper position to begin maintenance of the panel (6). In the particular embodiment shown in the Figures, a first and second sensor support (137A)(137B) can be correspondingly coupled proximate the body first and second end (116)(117). The first and second sensor support (137A)(137B) outwardly extend to a sensor support terminal end (139). A first and second body position sensor (121A)(121B) can be correspondingly mounted proximate each sensor support terminal end (139). Each of the first or second body position sensors (121A) (121B) (or both) can generate a sensor signal (138) which varies based on the distance of the first or the second sensor (121A)(121B) (or both) from the surface of the panel (6).

Blower Assembly.

Now with general reference to FIGS. 5 through 22, embodiments of the panel maintenance assembly (5) can, but need not necessarily, include a blower assembly (140) including a blower device (141) connected to an air distribution channel (142) which provides an air flow path (143) to distribute an air flow (144) from the blower device (141) directed toward the panel (6). In particular embodiments, the blower device (141) can be a centrifugal blower (141') as shown in the Figures including circular or cylindrical impeller having a series of vanes driven by a motor. As the impeller rotates, the air surrounding it also rotates at the same speed. This action imparts a centrifugal force to the air, causing it to move radially outwards to the walls of the blower or fan housing following a spiral trajectory increasing in pressure and velocity until it exits a blower discharge port (145) of the blower device (141). While the embodiment shown in the Figures comprises a single stage centrifugal blower; this is not intended to preclude embodiments which may include one or more: single stage centrifugal blowers, a dual stage centrifugal blower, a multistage centrifugal blower, positive displacement blower; helical screw blower, high speed blower having a plurality of impellers, regenerative blower, or other blower device which generates air pressure at the discharge port of in the range of about 5 pounds per square inch ("psi") to about 25 psi and generates a flow rate in the range of about 500 meters cubed ("m$^3$") to about 2000 m$^3$ depending on the application.

The blower device (141) delivers the air flow (144) from the blower discharge port (145) to the air flow path (143) of the air distribution channel (142). The air distribution channel (142) can, but need necessarily, be configured as an elongate open sided channel (142') disposed along substantially the entire length of the body (121). In particular embodiments, the air distribution channel (142) can comprise a tubular conduit having one or more apertures or an elongate slit through which air flow (144) egresses. The blower discharge port (145) of the blower device (141) can be coupled to a first channel end (146) to deliver the air flow (143) along the air flow path (143) defined by the air distribution channel (142) to egress at the air distribution channel open side (147). The air distribution channel (142) can be configured to be disposed in adjacent spaced apart relation to the panel (6) during panel maintenance such that the air flow (144) egressing from the open side (147) of the air distribution channel (142) flows across the panel (6). The air flow (144) can have a velocity sufficient to remove in part or all foreign matter (7) from the panel (6). The air distribution channel (142) can be a component constructed separate from the body (120) of the panel maintenance unit (5) and connected or removably connected to the body (120) depending upon the application; however, in particular embodiments the air distribution channel (142) can be integral with the body (120) of the panel maintenance assembly (5).

Sweeps.

Now, with general reference to FIGS. 5 through 22, in particular embodiments, the body (120) can carry one or more sweeps (123). In particular embodiments, each sweep (123) can include a set of resiliently deflectable bristles (148)(also referred to as "bristles") extending from the body (120) such that the bristles (148) can impinge on and can be deflected by the panel (6) or light transmissive layer (32) upon disposing the panel maintenance unit (5) over the panel (6) or light transmissive layer (32) of the panel (6). The bristles (148) can be made of a natural or synthetic material and be of greater or lesser coarseness depending upon the application.

Figure 21:
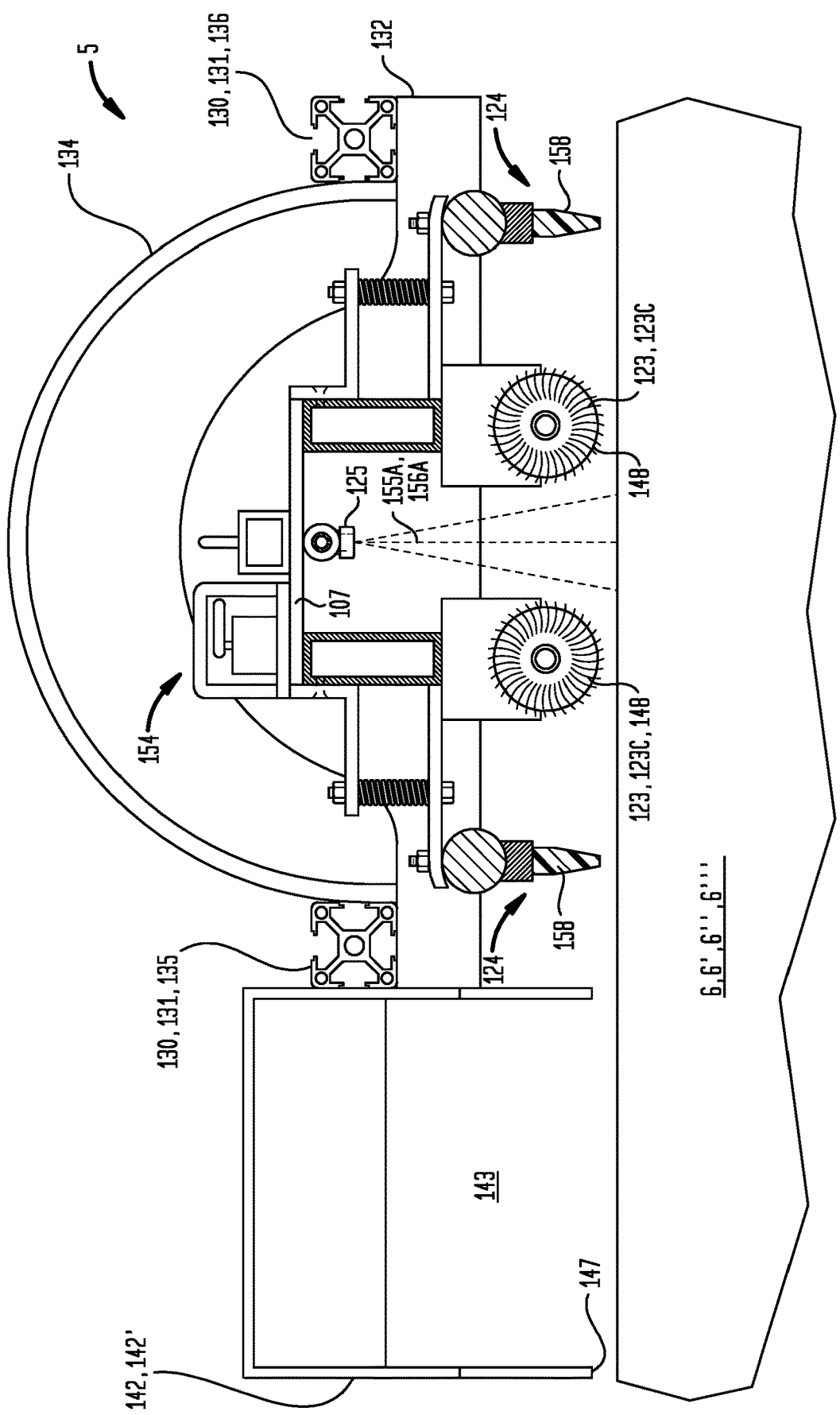
FIG. 21 is cross section view 21-21 as shown in FIG. 6A of a particular embodiment of the panel maintenance unit including a sweep in the form of a pair of liner sweep, a pair of wipers, and a plurality of fluid ports disposed medially between the pair of liner sweeps.

Now, with primary reference to FIG. 21, the sweep (123) can include substantially linear bristle retaining channel (149) which carries the bristles (148) of the sweep (123) which can, but need not necessarily, have a width of about one quarter inch to about one inch and a length of about seven feet to about ten feet. In particular embodiments, a sweep support (150) can be disposed on or in the body (120) allowing interchangeable replacement of the sweeps (123). A sweep (123) suitable for use with particular embodiments of the invention can be the same or similar to Har-tru Lee, Part No. 0100-136-3669. In in a particular embodiment, one of the first sweep (123A) or the second sweep (123B) can correspondingly extend along the length of one of the pair of elongate members (135)(136) included in the framework (130) of the panel maintenance unit (5).

Figure 19:
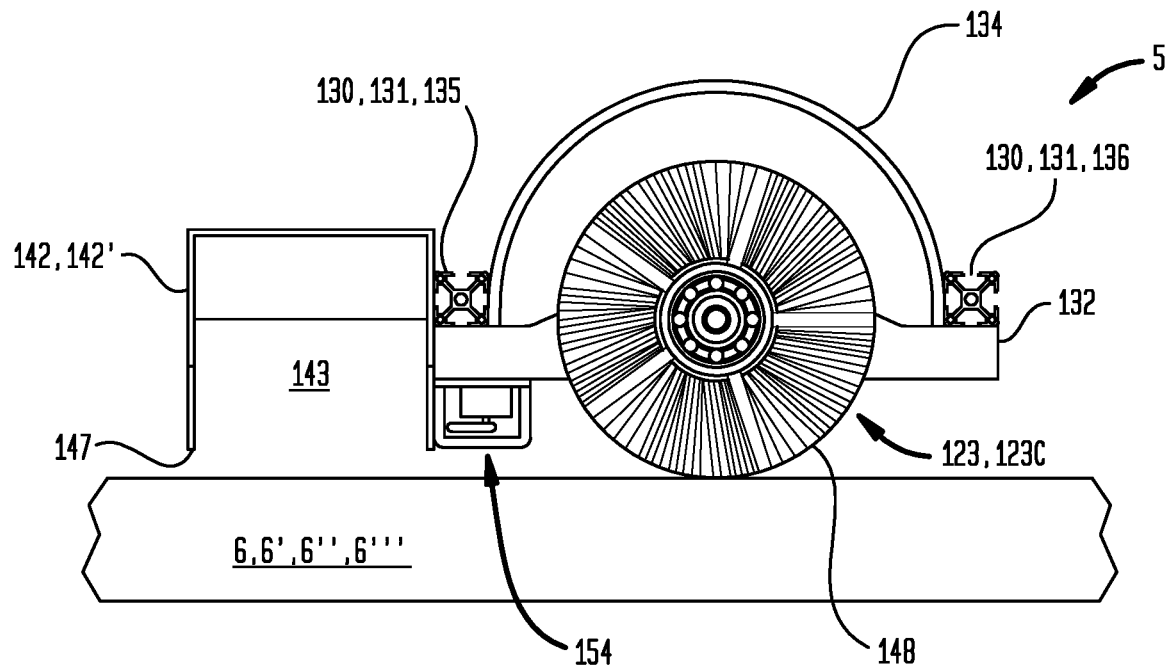
FIG. 19 is cross section view 19-19 as shown in FIG. 6A of a particular embodiment of the panel maintenance unit including a sweep in the form of a roller brush.
Figure 20:
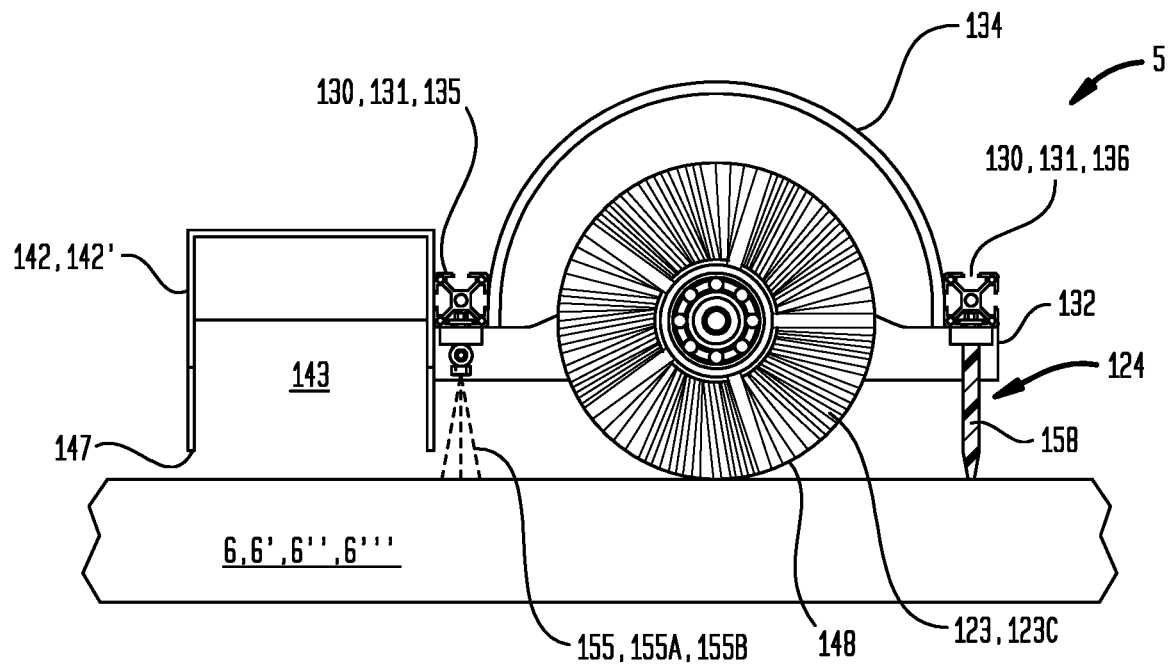
FIG. 20 is cross section view 20-20 as shown in FIG. 6A of a particular embodiment of the panel maintenance unit including a sweep in the form a roller brush, a wiper, and a plurality of fluid ports.
Figure 22:
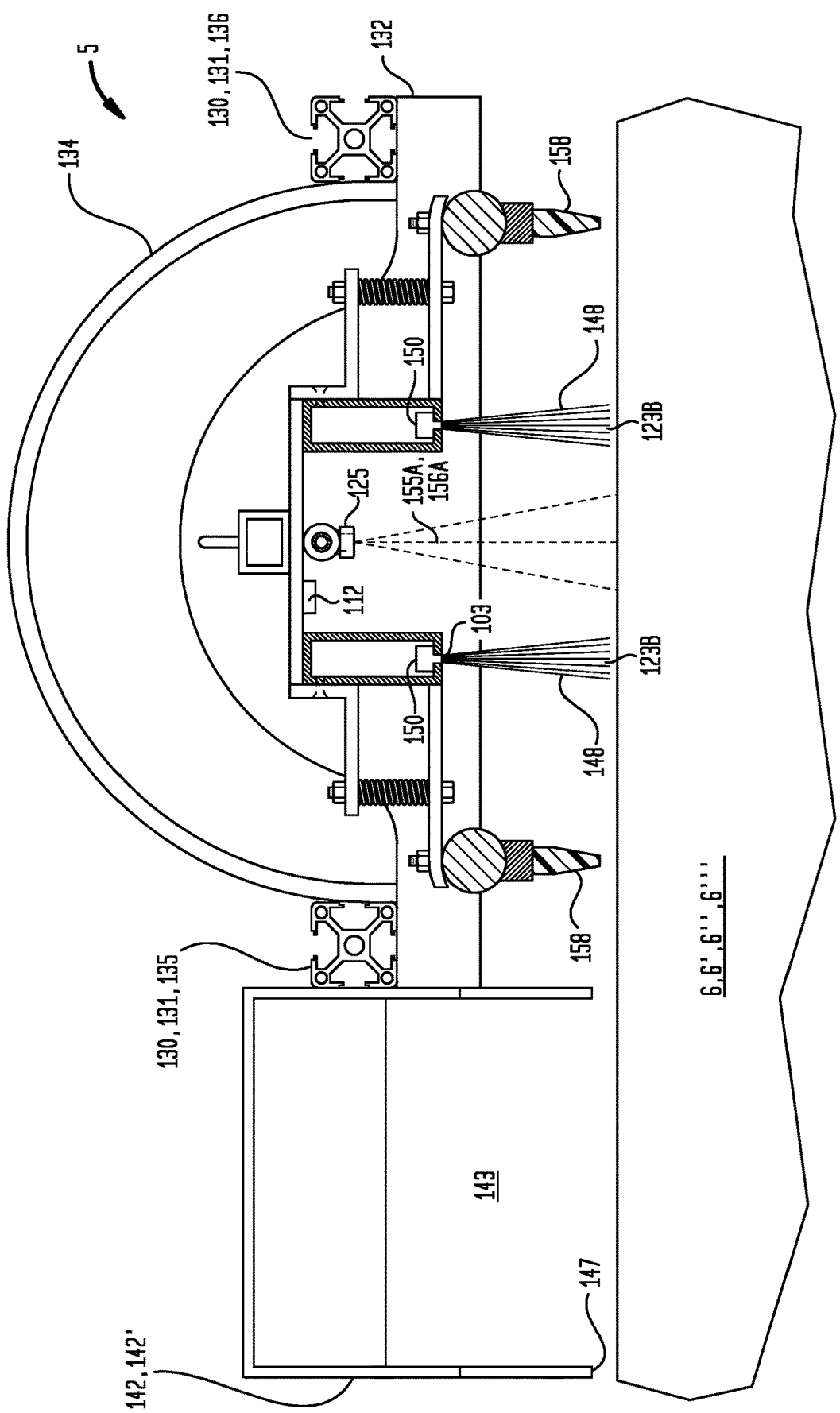
FIG. 22 is cross section view 22-22 as shown in FIG. 6A of a particular embodiment of the panel maintenance unit including a sweep in the form of a pair of roller brushes, a pair of wipers, and a plurality of fluid ports disposed medially between the pair of roller brushes.

Again, with primary reference to FIGS. 19, 20 and 22, in particular embodiments, the sweep (123) can, but need not necessarily, comprise a cylindrical brush roller (123C). The cylindrical brush roller (123C) can carry an outwardly extending plurality of bristles (148). The cylindrical brush roller (123C) can be rotatably mounted upon brush roller bearing surfaces (151)(152) of the body (120) and directly connected, or indirectly coupled by a driving belt or gear box, to an electric motor (153) to rotatingly drive the cylindrical brush roller (123C). In particular embodiments the sweep (123) can include one cylindrical brush roller (123C) continuously extending along the length of the body (90). In particular embodiments, a pair of cylindrical brush rollers (123C) can continuously extend along the length of the body (120) in generally parallel spaced apart relation. Each of the cylindrical brush rollers (123C) can comprise one continuous brush roller (1123C) or can comprise two or more cylindrical brush rollers (123C) linearly aligned to provide one sweep (123).

Figure 2:
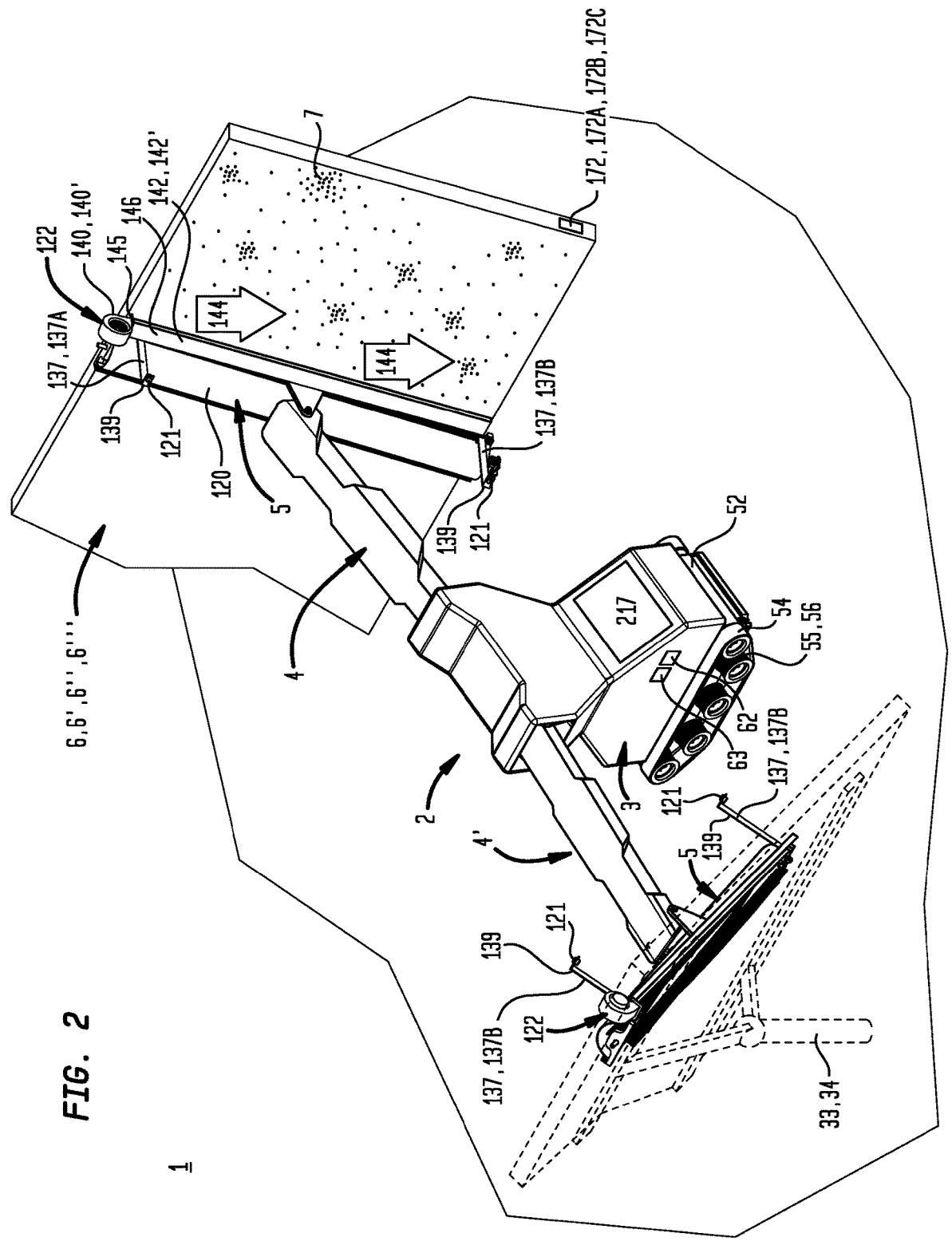
FIG. 2 is perspective view an illustrative embodiment of a mobile panel cleaner having a plurality of carriage arms.

In particular embodiments, as shown in the illustrative example of FIGS. 1 and 2, the panel maintenance assembly (5) can include one or more sweeps (123) having a substantially linear configuration or roller brush configuration extending, in whole or in part, between the body first and second ends (116)(117) which can correspondingly sweep the surface of the panel (6) or light transmissive layer (32). The sweep(s) (123) can, but need not necessarily, extend over the entire length or the width of the panel (6) or light transmissive layer (32).

Vibrating Unit.

Now referring primarily to FIG. 19, in particular embodiments, a vibrating unit (154) can, but need not necessarily, be connected to the body (120) of panel maintenance assembly (5) to transmit vibrations or oscillations through the body (120) of the panel maintenance assembly (5), or can directly vibrate or oscillate the first sweep (123A) or the second sweep (123B) or the roller brush (123C). In particular embodiments, the vibrating unit (154) can comprise an electric motor and having a shaft which can be unbalanced by attachment of an eccentric weight. The vibrating unit (154) the body (120) to transmit vibrations or oscillations to the body (120) of the panel maintenance unit (5). In particular embodiments, the sweep support (150) can be formed of a deformable resilient material and the vibration unit (154) can be coupled to the first or second sweep (123A)(123B) to generate movement of the sweep (123) in the deformable resilient sweep support (150).

Fluid Ports.

Figure 12B:
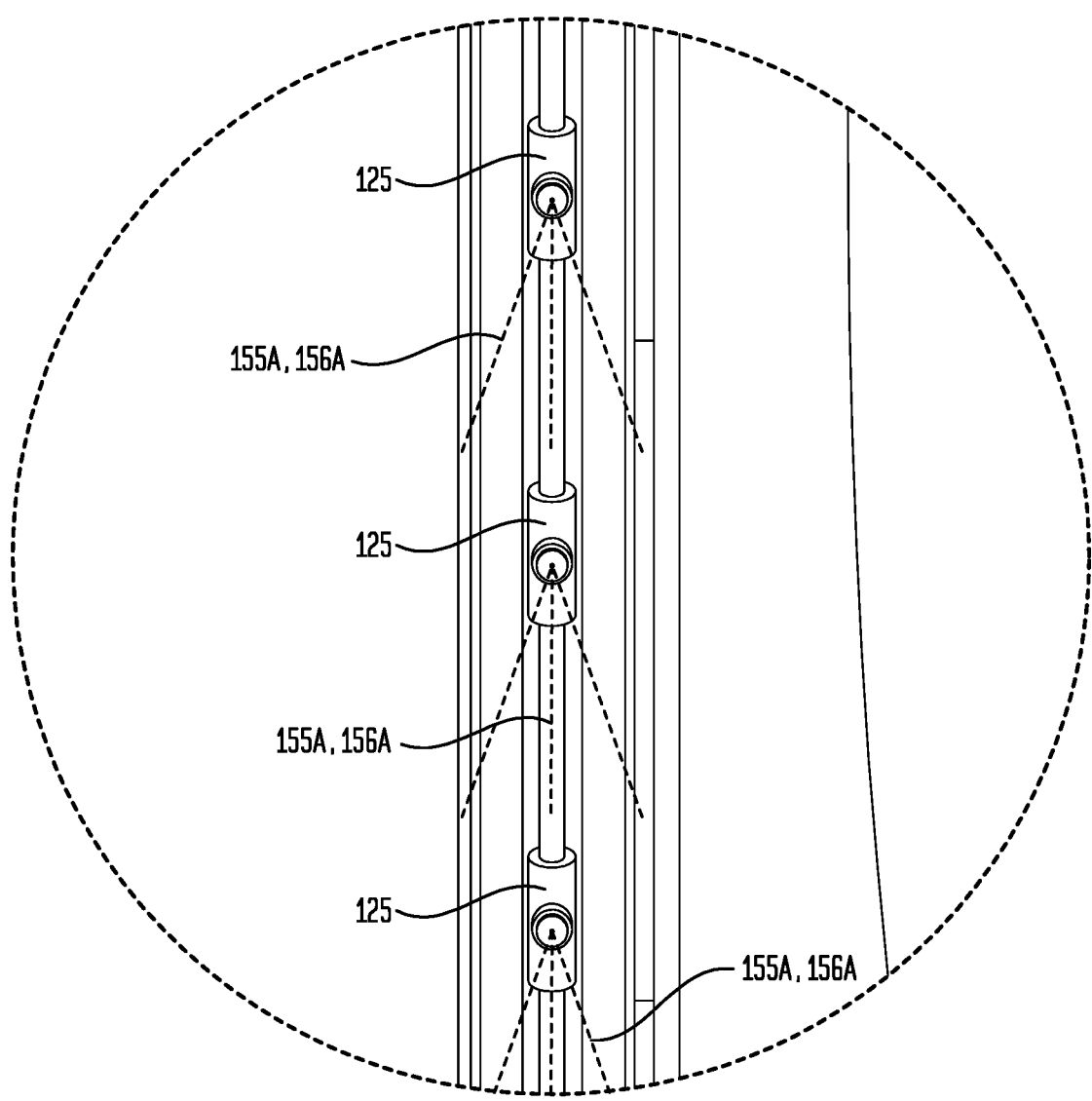
FIG. 12B is an enlarged view of the fluid ports depicted in FIG. 12A.
Figure 15:
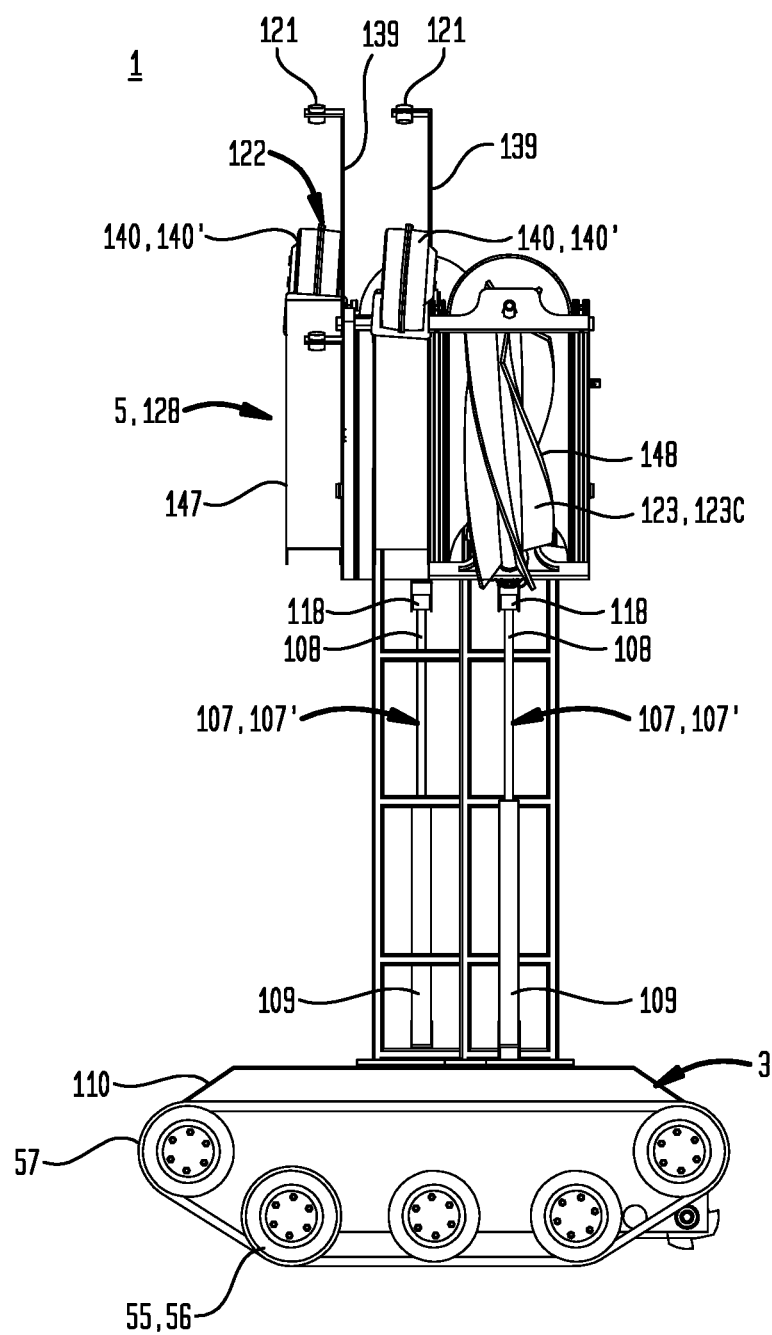
FIG. 15 is a first side elevation view of the illustrative embodiment of the mobile panel cleaner shown in FIG. 13.
Figure 16:
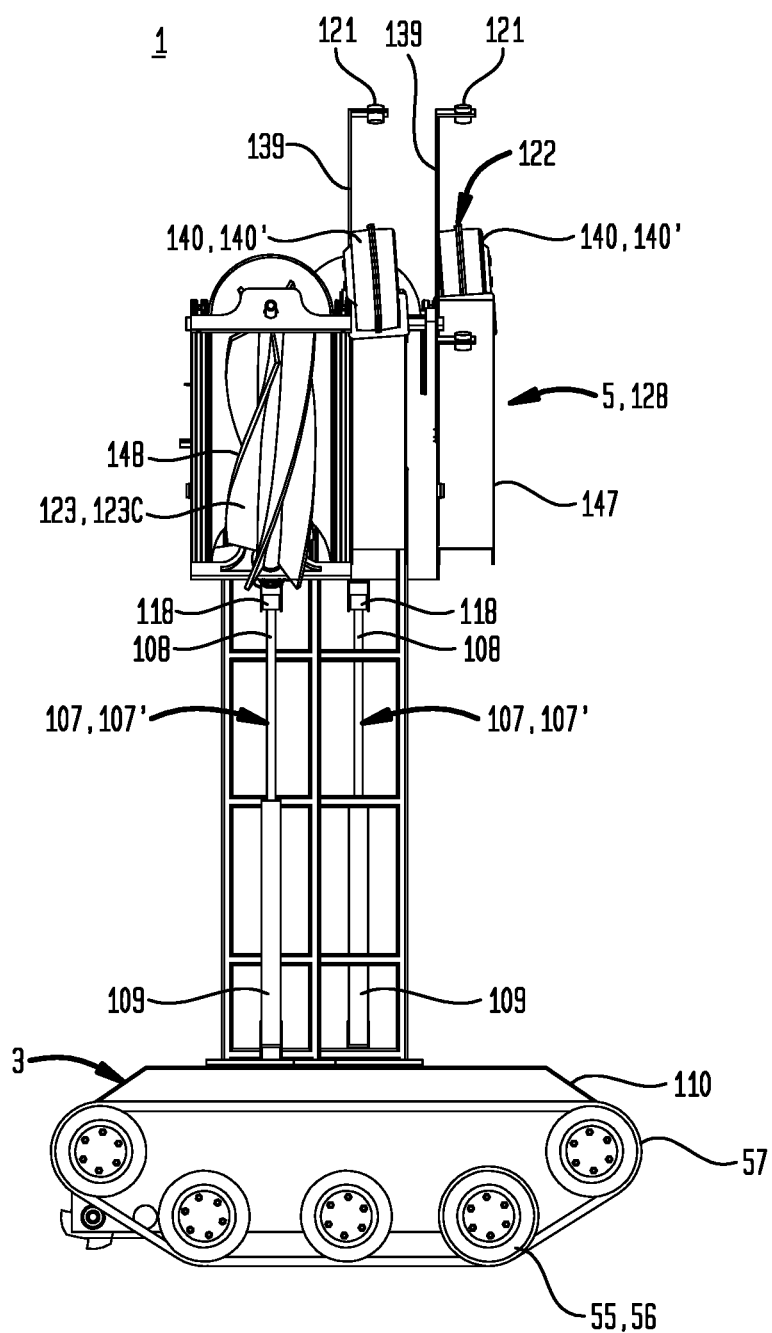
FIG. 16 is second side elevation view of the illustrative embodiment of the mobile panel cleaner shown in FIG. 13.
Figure 17:
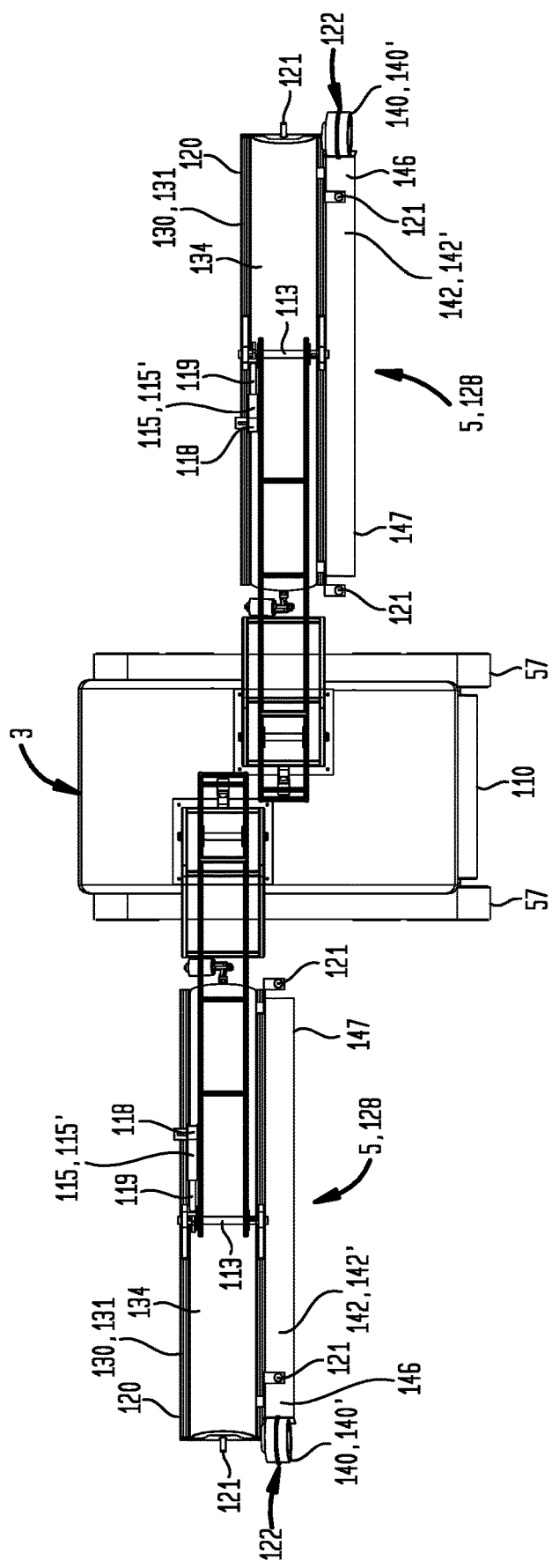
FIG. 17 is top plan view of the illustrative embodiment of the mobile panel cleaner shown in FIG. 13.
Figure 18:
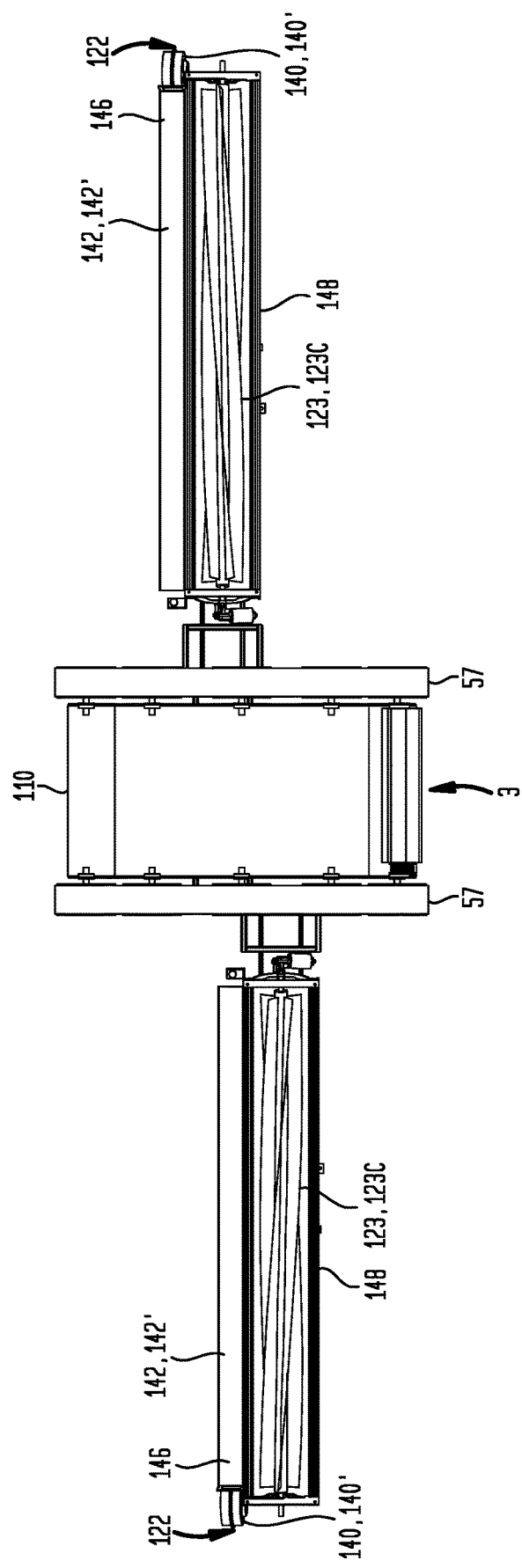
FIG. 18 is bottom plan view of the illustrative embodiment of the mobile panel cleaner shown in FIG. 13.

Now with primary reference to FIGS. 12, 12B, and 23, one or a plurality of fluid ports (125) can be disposed on or in the body (120) of the panel maintenance unit (5). The fluid ports (125) can be fluidically coupled by fluid port conduits (155) to one or both of the fluid flow generator (81) or gas flow generator (91). Depending on the application, operation of the fluid flow generator (81) or the gas flow generator (91), or both, can generate a fluid flow (155) or a gas flow (156) to correspondingly discharge a liquid stream (155A) or a gas stream (156A), or if the gas flow generator (71) comprises a vacuum pump (157), uptake a liquid stream (155A) or a gas stream (156A) through each of the fluid ports (125). In particular embodiments, a plurality of fluid ports (125) can be disposed in fixed immovable spaced apart relation on or in the body (120) between body first and second ends (116)(117). In particular embodiments, a plurality of fluid ports (125) can be disposed in fixed immovable spaced apart relation between the body first and second ends (116)(117) and adjacent the sweep (123), or medially between first and second sweeps (123A)(123B). In particular embodiments, the fluid ports (125) can be configured as spray nozzle generating a circular discharge or uptake pattern or one or more elongate tubular slots which generate an oval or rectangular discharge or uptake patterns.

Wiper.

Now, with primary reference to FIGS. 20 through 22, in particular embodiments, the panel maintenance unit (5) can carry one or more wipers (124) without fluid ports (125) or sweeps (123), or one or more wipers (124) only with fluid ports (125), or one or more wipers (124) with one or more sweeps (123), or one or more wipers (123) with one or more sweeps (123) and one or more fluid ports (125) in various fixed spatial configurations.

Each wiper (124) can include an elastomeric blade (158) (also referred to as a "blade") extending from the body (120) of the panel maintenance unit (5) such that the blade (158) can impinge on and can be deflected by the surface of the panel (6) or light transmissive layer (32) of a panel (6). The blade (158) can be produced from a variety of conventional elastomers to provide a sufficient amount of deflection of the blade (158) in contact with the light transmissive layer (32), and as non-limiting examples, the blade (158) can comprise one or more of: general purpose rubber such as silicone base rubber, natural rubber, chloroprene rubber, dimethyl silicone raw rubber, methyl vinyl silicone raw rubber, methyl phenyl vinyl silicone raw rubber, and fluorosilicone raw rubber. The hardness of the elastomeric blade after the curing can be in the range of between about 50 to about 80 Durometer Type A as defined by JIS-K6253. As to certain embodiments of the invention, the elastomeric blade (158) may function primarily to move foreign matter (7) from the surface of the panel (6) or light transmissive layer (32) of the panel (6) or may function as a squeegee to move liquid on the panel (6) or the light transmissive layer (32) of the panel (6) whether resulting from environmental conditions (64) or dispersed from the fluid ports (125). While the wiping property of the blade (158) may deteriorate when the rubber hardness is lower than 50 A durometer as well as higher than 80 A durometer (embodiments occurring incrementally in the range), the invention is not so limited, and depending upon the application the hardness may be less than 50 A or greater than 80 A.

In particular embodiments, there may not be a sweep (123) and only one wiper (124) may extend from the body (120) to impinge on the surface of the panel (6) or the light transmissive layer (32) of the panel (6). In particular embodiments, one wiper (124) can be disposed in generally parallel adjacent relation to one sweep (123) and optionally fluid ports (125) can be disposed medially between the sweep (123) and the wiper (124). In particular embodiments, a pair of sweeps (123A)(123B) can be disposed in generally parallel spaced apart relation and one wiper (124) can be disposed in generally parallel spaced apart relation to one of the sweeps (123), optionally fluid ports (125) can be disposed medially between the pair of sweeps (123A)(123B). In particular embodiments, a pair of wipers (124A)(124B) can be disposed in generally parallel spaced apart relation medially between a pair of sweeps (123A)(123B) and optionally fluid ports (125) can be disposed medially between the pair of wipers (123A)(123B). In particular embodiments, a wiper support (159) can be disposed on or in the body (120) allowing interchangeable replacement of the wiper (123). In particular embodiments, the sweeps (123) or the wipers (124) can be disposed in relation to the fluid ports (125) to move liquid discharged from the fluid ports (125) onto the panel (6) or light transmissive layer (32) of the panel (6) and then toward a fluid catch (82) disposed on the mobile base (3).

Logic Control Unit.

Now referring primarily to FIGS. 3 and 4, embodiments of the mobile base (3) further include one or more logic control circuits (8) including a logic control processor (159) communicatively coupled to a logic control unit non-transitory computer readable media (160) (also referred to as the "logic control unit memory"). The logic control circuits (8) can access and process data received from one or more of: the server computer (12), the map database (29), the panel array database (36), the GPS system (21), the RTK system (27), one or more of the client computing devices (11), the navigation sensors (62), and panel maintenance body position sensors (121).

The Navigation Controller.

Again, with primary reference to FIGS. 3 and 4, in particular embodiments, the user interface module (47) can operate to depict a graphical user interface (46') on the display surface (50) of each client computing device (11) in the system (1) to provide a spatially referenced two or three-dimensional navigation space (159) (also referred to as the "navigation space"). For the purposes of this invention, the term "spatially referenced three-dimensional navigation space (113)" means a mathematical representation of visual elements within a coordinate system wherein each point within the three-dimensional navigation space or any visual element therein can be associated with a location coordinate (x,y) or (x,y,z) and by using a collection of points connected by various geometric entities such as lines, planar surfaces, curved surfaces, or the like, the environmental surfaces of geographic areas, and manmade surfaces of buildings, including panel arrays (6'), or panels (6) can be mathematically represented and converted by the a user interface module (47) into graphical representations spatially referenced within the navigation space (159) which can be depicted on the display surface (50) of each client computing device (11) within the system (1). The user interface module (47) includes various known software components for rendering and displaying graphics on touch screen or other display, including components for changing various the visual properties (as examples, brightness, transparency, saturation, contrast or other visual property) of graphics that are displayed. As used herein, the term "graphics" includes any object that can be displayed to a user, including without limitation maps, web pages, digital images, videos, animations, text, icons, user-interface objects such as soft keys, and the like, or combinations thereof.

By user command (48) in the graphical user interface (47'), a navigation module (160) can be activated to depict the navigation space (159) and operably couple the client computing device (11) to one or more the map database (29). The navigation module (160) further operates to depict a visual representation of a geographic area (161) wherein each point can be spatially referenced to location coordinates (26) in the navigation space (159). The navigation module (160) further depicts navigation controls (162) on the display surface (50) of the client computing device (11) including a pan control (163A) which allows a user (44) by user command (48) in the graphical user interface (47') to directionally move the visual representation of the geographic area (161) on the display surface (50) (North, South, East, or West) to display areas of the visual representation of a geographic area (161) which at the depicted scale lie outside of the display surface (50). The navigation controls (162) can further include an image scale control (163B) operably coupled to the visual representation of the geographic area (161) to allow the visual representation of the geographic area (161) to be increased or decreased in scale on the display surface (for example with a zoom tool). However, these examples of directionally moving and altering scale of the visual representation of a geographic area (161) are illustrative and other embodiments can allow the visual representation of a geographic area (161) to be directionally moved or altered in scale by user command

(48) including as examples, one or more of: key stroke, mouse drag, touch drag, voice, or combinations thereof.

Again, by user command (48) in the graphical user interface (47'), the navigation module (160) can be activated to operably couple the client computing device (1) to the panel array database (36). The navigation module (160) further operates to depict a visual representation of the panel array (164) in the navigation space (161) wherein each point in the panel array (6') or an individual panel (6) can be spatially referenced by or to panel array (6') or panel (6) location coordinates (39)(40).

The Tracking System.

Again, with primary reference to FIGS. 3 and 4, the navigation module (160) can further function under control of the processor (20)(42) to determine the relative origin location coordinates (165) of each client computing device (11) and each mobile panel cleaner (2) in the system (1) by receiving and analyzing corresponding GPS (21) or RTK (27) signals corresponding received and transmitted by each computing device (1) and each mobile panel maintenance unit (2). The navigation module (160) can further function to depict a map origin location icon (166) in the visual representation of the geographic area (161) at the received GPS (21) or RTK (27) location coordinates (26) of each computing device (11) and each mobile panel maintenance unit (2). Destination location coordinates (167) for each mobile panel cleaner (2) can then be entered into the navigation space (161). In particular embodiments, the destination location coordinates (167) can be entered by user command (48) in the navigation space (161), whether by entry of x,y or x,y,z destination location coordinates (26), or can take the form of click event on a geographic target (168) in the visual representation of the geographic area (161), or by positioning a map destination location icon (166) in the visual representation of the geographic area (161) for each mobile panel cleaner (2). In particular embodiments, entry of destination location coordinates (167) can include entry of a plurality of destination location coordinates (167) between the origin location coordinates (165) and the destination location coordinates (167) to corresponding create a travel route (169) for each of a plurality of mobile panel maintenance units (2). In particular embodiments, pre-selected destination location coordinates (170) or pre-selected travel routes (171) for each mobile panel maintenance unit (2) can be entered automatically by the navigation module (161) based on occurrence of one or more: pre-selected travel start dates and times, sensed environmental conditions (EC) such as: temperature, rain, humidity, snow, dew, atmospheric particulate, or the like), or sensed panel array or panel conditions (such as, solar panel efficiency, reflectivity of the light transmissive layer, light transmissivity of the light transmissive layer, or the like.

In particular embodiments, a tag (172) can be disposed at specific destination location coordinates (170). As an illustrative example, one or more tags (172) can be disposed on or proximate a panel (21) or a panel array (20). Each tag (172) can be sensed by a mobile panel cleaner (2) navigation sensors (62). Based on occurrence of the sensed tag (172), or the current panel array data (37) associated with the sensed tag (172), such as: monitored environmental conditions, or monitored panel array or panel conditions, the navigation module (160) can further function to position the mobile panel maintenance unit (2) in relation to the panel (6) to activate a panel cleaning module (173) of the program (17) to conduct pre-selected panel maintenance events (188) in maintenance of the panel (6) or light transmissive layer (32) of the panel (6), including one or more of: subsequent travel of the mobile base (3) in relation to the panel (6), movement of the carriage arm (4), and movement of the panel maintenance unit (5) to dispose or maintain the sweeps (123) or wipers (124) of the panel maintenance unit (44) incident on the panel (6) or light transmissive layer (32), and further coordinate operation of sweeps (123) including rotating a roller brush sweep (123C), the vibrating unit (154), the fluid flow generator (81), and to position the fluid catch (82) in relation to the panel (6).

For the purposes of this invention, the term "tag" in particular embodiments means one or more of a location-indicating tag (172a), object-indicating tag (172b), or a function-indicating tag (172c). Without limitation to the breadth of the foregoing, a tag (172) can comprise any one or more of a sensorially perceivable image, material or substance, frequency of currents, electromagnetic waves, sound, and without limitation to the breadth of the foregoing: a reflective material or substance, an infra-red absorptive material or substance, an identifiable image, a radio frequency identification signal, radio frequency transmission, tone, or the like. Tags (172) can be error-correctably encoded in the map database (29), panel array database (36) or navigation module (160) to make them tolerant to surface damage or deterioration of tag (172).

A location-indicating tag (172a) can be associated with a tag identification (174) which, when translated through the navigation module (160) can be associated with tag location coordinates (175) (x,y or x,y,z) in the navigation space (159). The tag-relative location coordinates (26) of the mobile panel cleaner (2) can be identified to yield the location of the mobile panel maintenance unit (2) in relation to the panel (6). Location-indicating tags (172a) therefore support the determination of a travel route (169) toward final destination location coordinates (167) (x,y or x,y,z) of the mobile panel cleaner (2) in relation to the panel (6) which can be depicted in the navigation space (159) displayed in the graphical user interface (47') on the display surface (50) of the client computing devices (11). In particular embodiments, the mobile panel maintenance unit (2) can, but need not necessarily, travel between panels (6)(6') based on tag-relative location coordinates (26) without corresponding GPS (21) or RTK (27) hardware implementations.

An object-indicating tag (172b) can be associated with a tag identification (174) which directly identifies a user interface element (176) in the graphical user interface (47') associated with the tag location coordinates (175) of the tag (172). As an illustrative example, the identified user interface element (176) could be a manual directional control interface element (177) in the graphical user interface (47') to temporarily drive the mobile panel cleaner (2) due to temporary conditions between the origin location coordinates (165) and the destination location coordinates (167) of a mobile panel maintenance unit (2).

A function-indicating tag (172c) can be associated with a tag identification (174) which directly identifies an operation or function element (178) within the panel cleaning module (173) to be performed by the mobile panel maintenance unit (2) or any component thereof, associated with the tag location coordinates (175) of the tag (172). As an illustrative example, the identified operation element (178) could be the stepwise movements of the mobile panel cleaner (2), carriage (4), or panel maintenance assembly (5) currently matched to the tag location coordinates (175).

Mapping System.

Again, with primary reference to FIGS. 3 and 4, in particular embodiments, the program (17) can further include a mapping module (179) which functions to control travel of the mobile panel maintenance unit (2) in a bounded geographic target area (180) to generate a series of location coordinates (26) defining a geographic surface area (181) and manmade surface areas (182) within the bounded geographic target area (180) which can be converted to a visual geographic representation of the target area (180) and depicted within the two or three-dimensional navigation space (159).

In particular embodiments, the user (44) can interactively select geographic target area (180) within the visual representation of the geographic area (161) displayed in the graphical user interface (47') depicted on the display surface (50) of the client computing device (11). As to particular embodiments, the mapping module (179) allows entry of location coordinates (26) which can be interconnected by linear or arcuate boundary segments (183) to establish a visual boundary (184) defining the geographic target area (180). In other particular embodiments, the mapping module (179) can display a cursor (185) in the visual representation of a geographic area (161) which can be moved to establish the visual boundary (184) about the geographic target area (180). While the visual boundary (184) shown in the example of FIG. 4 includes a substantially square visual boundary (184) which bounds and defines a substantially square geographic target area (180); the user (44) can establish the visual boundary (184) in the visual representation of the geographic area (161) in any manner which bounds at least a portion of the visual representation of the geographic area (161). Subsequently, the mapping module (179) can generate travel of the mobile panel maintenance unit (2) within the geographic target area (180). The mapping module (179) can acquire a sequence of the GPS (21) or RTK (27) location coordinates (26) by an in-vehicle GPS receiver (22) or RTK receiver (186) and the corresponding visual representation of the geographic area (161) can contain the travel route (169) of the mobile panel maintenance unit (2), which generates matching of location coordinates (26) in the coordinate system of the two or three-dimensional navigation space (159). The GPS (21) or RTK (27) tracking location coordinates (26) may not be sufficient to represent precise panel location coordinates (40) within the navigation space (159) because of an error deviation in the GPS (21) or RTK (27) location coordinates (26). However, a collection and the accumulation of a large number GPS (212) or RTK (26) location coordinates (26) can allow panel location coordinates (40) to be statistically derived from the GPS (21) or RTK (27) location coordinates (26) which can be used in coordination with navigation sensors (62), tag data (187) and panel array data (37) to generate a map of the geographic target area (180) sufficient in detail to allow operation of the mobile panel cleaner (3) to perform panel maintenance events (188) independent of manual operation by a user (44).

Electronic Data Exchanger.

Again, with primary reference to FIGS. 3 and 4, in particular embodiments, the program (17) can operate an electronic data exchanger (189) which functions to transmit mobile base pairing information (190) to a client computing device (11). In particular embodiments, the mobile base (3) can further include a radio frequency controller (191) which operates a radio frequency transmitter (192) to cause wireless connection or pairing of the mobile base (3) with a client computing device (11) over a short-range radio frequency band (193) to carry a signal over all or a part of the communication path between the mobile base (5) and the client computing device (11). The short-range frequency band (193) can include, as illustrative examples: BLU-ETOOTH® (194) which operates at frequencies of about 2402 MHz to about 2480 MHz or about 2400 MHz to about 2483.5 MHz or WI-FI® (195) which operates at about 2.4 GHz or 5 GHz. In other particular embodiments, the mobile base (3) can, but need not necessarily include, a tone generator (196) which generates tones (197) also referred to as an "audio beacon" that provides a signal over the communication path between the mobile base (3) and the client computing device (11).

In particular embodiments, the electronic data exchanger (189) can further operate to transmit a base identification code (198) from the mobile base (3) to be received by the client computing device (11). The base identification code (198) can include a string of data which can be correspondingly associated with data held in the server (12), the map database (29) or the panel array database (36), or in a client computing device (11).

The base identification code (198) and the associated data string can identify discrete portions of the data contained in the server (12), the map database (29), the panel array database (36) or a client computing device (11) and can include instructions on utilizing those discrete portions of the data. For example, the electronic data exchanger (189) can transmit a string of data such as C12.B1.F1.xx1111.1234 where C12 identifies a client computing device (11), and xx1111 can identify or provide data retrieval information (199) of panel cleaning data (200), and 1234 can identify the panel cleaning conditions (201) to be met to activate the panel cleaning module (173) which functions to retrieve and decode the panel cleaning data (200) and perform the panel cleaning events (188).

For example, the panel cleaning conditions (201) to be met can include one or more of: location of the mobile base (3) based on one or more location coordinates (26) derived by operation of a global signal analyzer (25) receiving GPS (21) or RTK (27) location coordinates (26) or combinations thereof, from a global positioning receiver (22) or RTK receiver (186) included in the base unit (3), environmental conditions (64), as above described, pre-selected dates (202) or preselected times (203), or combinations thereof.

Also, as examples, "B1" in the data string can indicate that a battery (213) has sufficient charge to perform the panel maintenance event (188). "R1" in the data string can indicate that the mobile base (3) has retrieved the panel cleaning data (200) to perform the panel maintenance event (188).

In particular embodiments, the electronic data exchanger (189) can further operate to transmit a panel maintenance performance notification (203) based on a match of the pre-selected panel cleaning conditions (204) and the current panel cleaning conditions (205). In particular embodiments, base unit (5) can send panel maintenance performance notification (206) in a string of data, such as, 1.2.3.4.5.6.7.8.9.10.11.12 where the data corresponds to one or more of: panel maintenance event location (207), panel maintenance event date (208), or panel maintenance event time (209) and identify the panel maintenance data (200) which was used in performance of the panel maintenance event (188), or combinations thereof. Alternately, a panel maintenance event notification (206) can correspond to binary indications (yes/no) that the panel maintenance event (188) has or has not been performed.

Power Management Unit.

Now referring primarily to FIG. 3, in particular embodiments, the mobile base (3) can further include a power management unit (210) which comprises a power management microcontroller (211) which governs power functions of the mobile base (3). The power management microcontroller (211) includes firmware and software held in a memory element a processor, input/output functions, timers to measure intervals of time, and analog to digital convertors to measure the voltages of the main battery (212) or power source of the mobile base (3). The power management unit (210) in coordination with the electronic data exchanger (189) can further operate to transmit a battery status notification (213) to the client computing device (11). In particular embodiments, the power management unit (210) can determine battery charge (214) of the battery (212) and activate a battery charging circuit (215). In particular embodiments, the battery charging circuit (215) can be coupled to a power source (216) such as a 12 Volt direct current source (for example, the electrical system of motor vehicle) or can convert or transform 110 Volt alternating current to 12 Volt direct current to charge the battery (212).

Solar Power Module.

Again, with primary reference to FIG. 3, in particular embodiments, the mobile base unit (3) can further include a photovoltaic panel (217) which can generate sufficient current over time to charge the battery (212) or supplement the battery (212) in operating the mobile base (3).

Docking Station.

Now, with primary reference to FIG. 3, the panel maintenance system (1) can, but need not necessarily include, a docking station (218) which interfaces with the mobile panel cleaner (2). As to particular embodiments, the docking station (218) can be disposed in relation to a panel array (6') to allow the mobile base (3) to move over the support surface (9) and dock with the docking station (218). Docking with the docking station (218) can include engaging matable portions of a docking station inlet port (219) and a docking station outlet port (220) of the docking station (218) with corresponding matable portion of a fluid reservoir inlet (221) and fluid reservoir outlet ports (222) of the fluid reservoir (65). The fluid reservoir inlet (221) and fluid reservoir outlet ports (222) can be configured to achieve an open condition (223) only upon mated engagement with the docking station inlet (219) and outlet ports (220).

Separation of the fluid reservoir inlet and outlet ports (221)(222) and the docking station inlet and outlet ports (219)(220) can achieve the closed condition (224) of the fluid reservoir inlet and outlet ports (221)(222) and the docking station inlet and outlet ports (219)(220). Particular embodiments of the docking station (218) can further include matable portions of a power supply connector (225) (226) which matably engage when the mobile base (3) docks with the docking station (218).

As can be easily understood from the foregoing, the basic concepts of the present invention may be embodied in a variety of ways. The invention involves numerous and varied embodiments of a mobile panel maintenance system and mobile panel cleaner and methods for making and using such system and mobile panel cleaner including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "fluid catch" should be understood to encompass disclosure of the act of "fluid catching"—whether explicitly discussed or not—and, conversely, were there effectively disclosure of the act of "fluid catching", such a disclosure should be understood to encompass disclosure of a "fluid catch" and even a "means for fluid catching." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the mobile panel maintenance systems or mobile panel cleaners herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A mobile panel maintenance unit, comprising:
a base supported for translational motion over a ground surface;
a carriage arm movably mounted to said base;
a panel maintenance assembly affixed in movable orientation to said carriage arm; and
a logic controller including a processor communicatively coupled to a non-transitory computer readable media containing a program code and a panel array database containing panel spatial information, including one or more of geographic panel location coordinates, location coordinates of panel dimensional boundaries, location coordinates of panel plane orientation,
said logic controller executes said program code to compare location coordinates of said mobile panel maintenance unit on said ground surface to said panel spatial information and to control operation of said mobile panel maintenance unit to position said mobile panel maintenance unit proximate a panel.

2. The mobile panel maintenance unit of claim 1, wherein said panel maintenance assembly includes a blower assembly having a blower device connected to an air distribution channel which provides an air flow path, said blower device operable to generate an air flow, said panel maintenance assembly under control of said logic controller positions said air distribution channel to direct said air flow outward of said air flow path of said air distribution channel toward a panel surface.

3. The mobile panel maintenance unit of claim 2, wherein said air distribution channel comprises an open-sided channel having said open side configured to face said panel surface, said blower connected to one end of said air distribution channel.

4. The mobile panel maintenance unit of claim 1, wherein said panel maintenance assembly includes one or more sweeps extending outward of said panel maintenance assembly, said panel maintenance assembly under control of said logic controller positions said sweeps to contact a panel surface.

5. The mobile panel maintenance unit of claim 4, wherein said one or more sweeps each include a linear bristle retaining channel which carries a plurality of bristles outwardly extending from said linear bristle retaining channel to contact said panel surface.

6. The mobile panel maintenance unit of claim 4, wherein said one or more sweeps each include a roller brush rotatably mounted in said panel maintenance assembly, said roller brush includes a roller which carries a plurality of bristles, said roller brush operable to rotatingly contact said plurality of bristles to said panel surface.

7. The mobile panel maintenance unit of claim 4, wherein said panel maintenance assembly includes vibrating unit to transmit vibrations or oscillations through said panel maintenance assembly to vibrate said one or more sweeps.

8. The mobile panel maintenance unit of claim 1, wherein said panel maintenance assembly includes one or more fluid ports, said panel maintenance assembly under control of said logic controller positions one or more fluid ports to deliver a fluid to a panel surface.

9. The mobile panel maintenance unit of claim 8, further comprising a fluid reservoir and a fluid flow generator carried by said base, said fluid flow generator operable to generate a fluid flow of said fluid from said fluid reservoir to said one or more fluid ports.

10. A mobile panel maintenance unit, comprising:
a base supported for translational motion over a ground surface;
a carriage arm movably mounted to said base;
a panel maintenance assembly affixed in movable orientation to said carriage arm;
a logic controller operable to control translational motion of said base over said ground surface;
a global positioning system receiver operable to communicatively couple to a global positioning system;
a real time kinematics receiver configured to communicatively coupled to a base station operable to broadcast a phase measurement of a carrier wave emitted by said global positioning system; and
a global position signal analyzer operable to compare said phase measurement of said carrier wave received by said real time kinematics receiver of said apparatus with said phase measurement of said carrier wave received by said base station, said global position signal analyzer based on comparison of said phase measurement of said carrier wave calculates location coordinates of said mobile panel maintenance unit to said base station.

11. A mobile panel maintenance unit, comprising:
a base supported for translational motion over a ground surface;
a carriage arm movably mounted to said base;
a panel maintenance assembly affixed in movable orientation to said carriage arm;
a logic controller including a processor communicatively coupled to a non-transitory computer readable media containing a program code, said logic controller operable to control operation of said mobile panel maintenance unit;
an electronic data exchanger communicatively coupled through a network to a panel array database including panel spatial information, including one or more of geographic panel location coordinates, location coordinates of panel dimensional boundaries, or location coordinates of panel plane orientation,
said logic controller compares location coordinates of said mobile panel maintenance unit on said ground surface to said panel spatial information to position said mobile panel maintenance unit proximate a panel, wherein said logic controller identifies location coordinates of panel dimensional boundaries or location coordinates of panel plane orientation to position said panel maintenance assembly in relation to said panel surface.

12. The mobile panel maintenance unit of claim 11, wherein said logic controller operable to control one or more of said base, said carriage, or said panel maintenance assembly to move said panel maintenance assembly across said panel surface to perform panel maintenance.

13. The mobile panel maintenance unit of claim 12, further comprising one or more navigation sensors mounted to said panel maintenance unit to generate panel surface detection signals which vary based on distance between said panel maintenance unit and a panel surface, said logic controller processes said panel surface detection signals based on said program code to maintain said panel maintenance assembly in uniform spatial relation to said panel surface to perform panel maintenance.

14. The mobile panel maintenance unit of claim 13, wherein said navigation sensors comprise one or more panel maintenance assembly position sensors mounted proximate said first and second ends of said panel maintenance assembly.

15. A mobile panel maintenance unit, comprising:
a base supported for translational motion over a ground surface;
a carriage arm movably affixed to said base;
a panel maintenance assembly affixed in movable orientation to said carriage arm; and
a logic controller including a processor communicatively coupled to a non-transitory computer readable media containing a program code, said logic controller operable to control operation of said mobile panel maintenance unit;
a fluid reservoir and a fluid flow generator carried by said base,
said fluid flow generator operable to generate a fluid flow of said fluid from said fluid reservoir to one or more fluid ports;
said panel maintenance assembly under control of said logic controller positions one or more fluid ports to deliver a fluid to a panel surface;
a fluid temperature sensor disposed to sense fluid temperature of said fluid; and
a fluid heater thermally coupled to said fluid, said logic controller operable to process fluid temperature sensor signals to operate said fluid heater to maintain a preselected fluid temperature.

16. A mobile panel maintenance unit, comprising:
a base supported for translational motion over a ground surface;
a carriage arm movably mounted to said base;
a panel maintenance assembly affixed in movable orientation to said carriage arm, said panel maintenance assembly having one or more wipers;
a logic controller including a processor communicatively coupled to a non-transitory computer readable media containing a program code, said logic controller operable to control operation of said mobile panel maintenance unit, said panel maintenance assembly under control of said logic controller positions said one or more wipers to contact a panel surface; and
a fluid catch carried by said mobile base, said fluid catch disposed in spatial relation to a panel by movement of said base to catch a fluid flowing from said panel.

17. A mobile panel maintenance unit, comprising:
a base supported for translational motion over a ground surface;
a carriage arm movably mounted to said base;
a panel maintenance assembly affixed in movable orientation to said carriage; and
a logic controller including a processor communicatively coupled to a non-transitory computer readable media containing a program code, said logic controller operable to control translational motion of said base over said ground surface;
a global positioning system receiver operable to communicatively couple to a global positioning system;
a global positioning signal analyzer operable to analyze a global positioning system signal, and optionally, a real time kinematics receiver communicatively coupled to a base station operable to broadcast a phase measurement of the carrier wave associated with said global positioning system signal, said global position signal analyzer operable to compare said phase measurement of said carrier wave received by said real time kinematics receiver of said apparatus with said phase measurement of said carrier wave received by said stationary base station, said global position signal analyzer based on analysis of said global positioning signal or based on comparison of said phase measurement of said carrier wave determines location coordinates of said mobile panel maintenance unit;
an electronic data exchanger operable to communicatively coupled directly, or indirectly through a network, to a client computing device,
said logic controller operable to execute said program code to:
access a map database including geographic spatial information to depict a visual representation of a geographic area;
access a panel array database including panel array information to depict a visual representation of a panel array in said visual representation of geographic area; and access said global positioning system or said real time kinematics system to depict an origin location icon associated with origin location coordinates of said mobile panel maintenance unit on a client computing device.

18. The mobile panel maintenance unit of claim 17, said logic controller executes said program code to depict a destination location icon associated with destination location coordinates of said mobile panel maintenance unit entered by user command in said client computing device, said logic controller operable to generate translational motion over said surface between said origin location coordinates and said destination location coordinates.

* * * * *